(12) United States Patent
Tsubata

(10) Patent No.: US 8,228,273 B2
(45) Date of Patent: Jul. 24, 2012

(54) ACTIVE MATRIX SUBSTRATE AND DISPLAY DEVICE HAVING THE SAME

(75) Inventor: Toshihide Tsubata, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

(21) Appl. No.: 12/226,605

(22) PCT Filed: Mar. 27, 2007

(86) PCT No.: PCT/JP2007/056329
§ 371 (c)(1),
(2), (4) Date: Oct. 23, 2008

(87) PCT Pub. No.: WO2008/015813
PCT Pub. Date: Feb. 7, 2008

(65) Prior Publication Data
US 2009/0167739 A1 Jul. 2, 2009

(30) Foreign Application Priority Data

Aug. 2, 2006 (JP) ................. 2006-210530
Dec. 28, 2006 (JP) ................. 2006-356448

(51) Int. Cl.
*G09G 3/36* (2006.01)
(52) U.S. Cl. ............... 345/87; 345/89; 345/92; 345/98; 345/100; 345/205; 349/39; 349/41
(58) Field of Classification Search ............... 345/76, 345/87, 98–100, 204–205
See application file for complete search history.

(56) References Cited

U.S. PATENT DOCUMENTS

| 4,488,150 A | 12/1984 | Kanatani |
| 5,790,092 A | 8/1998 | Moriyama |
| 6,046,790 A | 4/2000 | Hara et al. |
| 6,097,452 A | 8/2000 | Shimada et al. |

(Continued)

FOREIGN PATENT DOCUMENTS

EP 1 235 199 8/2002
(Continued)

OTHER PUBLICATIONS

Extended European Search Report dated Nov. 5, 2010.
(Continued)

*Primary Examiner* — Quan-Zhen Wang
*Assistant Examiner* — Jennifer Nguyen
(74) *Attorney, Agent, or Firm* — Harness, Dickey & Pierce, P.L.C.

(57) ABSTRACT

One embodiment of the present invention is to prevent deterioration of display quality from occurring in a display device provided with an active matrix substrate even when a larger size or a higher resolution is employed and a drive frequency is increased. In an active matrix substrate of a liquid crystal display device, a discharge control signal line is disposed so as to be arranged along each gate line and discharge TFTs are provided for each source line in numbers equal to the number of the gate lines. The gate terminal, source terminal, and drain terminal of the discharge TFT are connected to the discharge control signal line, the storage capacitance line, and its adjacent source line, respectively. Each storage capacitance line is provided with the common potential Vcom. Each discharge control signal line is provided with a signal which turns on the discharge TFT for a predetermined period of every one horizontal period.

26 Claims, 21 Drawing Sheets

U.S. PATENT DOCUMENTS

| | | | |
|---|---|---|---|
| 6,473,077 | B1 | 10/2002 | Takenaka et al. |
| 6,642,916 | B1 | 11/2003 | Kodama et al. |
| 6,876,349 | B2 | 4/2005 | Edwards et al. |
| 6,937,224 | B1 | 8/2005 | Miyachi |
| 7,369,124 | B2 | 5/2008 | Nakano et al. |
| 7,843,410 | B2 | 11/2010 | Floyd |
| 2002/0118154 | A1* | 8/2002 | Kim .............................. 345/87 |
| 2003/0090449 | A1 | 5/2003 | Arimoto et al. |
| 2003/0090450 | A1 | 5/2003 | Inada et al. |
| 2003/0151572 | A1 | 8/2003 | Kumada et al. |
| 2004/0017344 | A1 | 1/2004 | Takemoto |
| 2004/0041763 | A1 | 3/2004 | Kodama et al. |
| 2004/0104881 | A1 | 6/2004 | Furuya |
| 2004/0217931 | A1 | 11/2004 | Shin |
| 2005/0017935 | A1 | 1/2005 | Hirama |
| 2005/0083278 | A1 | 4/2005 | Teraishi |
| 2005/0122321 | A1 | 6/2005 | Akai et al. |
| 2005/0151714 | A1 | 7/2005 | Hirama |
| 2005/0219196 | A1 | 10/2005 | Lee |
| 2006/0001628 | A1 | 1/2006 | Kawaguchi |
| 2006/0028463 | A1 | 2/2006 | Nakamura et al. |
| 2006/0050043 | A1 | 3/2006 | Kawagoe |
| 2006/0061534 | A1 | 3/2006 | Lee |
| 2006/0061540 | A1 | 3/2006 | Harada |
| 2006/0262071 | A1 | 11/2006 | Shieh et al. |
| 2007/0018923 | A1* | 1/2007 | Yokota ............................ 345/89 |
| 2007/0030230 | A1 | 2/2007 | Lee |
| 2008/0001876 | A1* | 1/2008 | Ito et al. .......................... 345/87 |
| 2010/0066719 | A1 | 3/2010 | Hirao |

FOREIGN PATENT DOCUMENTS

| | | |
|---|---|---|
| EP | 1 286 202 | 2/2003 |
| EP | 1 424 589 | 6/2004 |
| GB | 2 429 569 | 2/2007 |
| JP | 09-243998 | 9/1997 |
| JP | 10-282524 | 10/1998 |
| JP | 11-30975 | 2/1999 |
| JP | 2000-122596 | 4/2000 |
| JP | 2000-148098 | 5/2000 |
| JP | 2000-267141 | 9/2000 |
| JP | 2001-60078 | 3/2001 |
| JP | 2002-62855 | 2/2002 |
| JP | 2002-268613 | 9/2002 |
| JP | 2002-328654 | 11/2002 |
| JP | 2003-66918 | 3/2003 |
| JP | 2003-255912 | 10/2003 |
| JP | 2003-302951 | 10/2003 |
| JP | 2004-279626 | 10/2004 |
| JP | 2004-334171 | 11/2004 |
| JP | 2005-12911 | 5/2005 |
| JP | 2006-47847 | 2/2006 |
| JP | 2006-72078 | 3/2006 |
| JP | 2007-41548 | 2/2007 |
| WO | WO 03/091790 | 11/2003 |
| WO | WO 2008/007480 | 1/2008 |
| WO | WO 2008/038431 | 4/2008 |

OTHER PUBLICATIONS

Supplementary European Search Report dated Dec. 13, 2010 for corresponding European Patent Application of a related U.S. Application.

Supplementary European Search Report dated Dec. 23, 2010 for corresponding European Patent Application of a related U.S. Application.

English translation of Chinese Office Action dated Dec. 16, 2010 for corresponding Chinese Patent Application No. 200780022213.2 of a related U.S. Application.

U.S. Office Action dated Mar. 14, 2011 for corresponding U.S. Appl. No. 11/922,756.

Office Action by the Japanese Patent Office dated May 31, 2011 for corresponding Japanese Patent Application JP 61-228491 with machine translation.

U.S. Office Action dated Oct. 20, 2011, for corresponding U.S. Appl. No. 11/922,756.

U.S. Office Action dated Sep. 29, 2011, issued in co-pending U.S. Appl. No. 12/226,056.

Notice of Allowance dated Sep. 23, 2011, issued in co-pending U.S. Appl. No. 12/311,968.

Notice of Allowance dated Oct. 7, 2011, issued in co-pending U.S. Appl. No. 11/922,758.

European Search Report dated Sep. 29, 2010 for corresponding European Patent Application of a related U.S. Application.

* cited by examiner

ACTIVE MATRIX SUBSTRATE AND DISPLAY DEVICE HAVING THE SAME

TECHNICAL FIELD

The present invention relates to an active matrix substrate using switching elements such as thin film transistors and an active matrix type display device such as a liquid crystal display device having the same.

BACKGROUND ART

An active matrix substrate is widely used in an active matrix type display device such as a liquid crystal display device and an EL (Electroluminescence) display device. For example, the main part of the active matrix type liquid crystal display device is composed of a liquid crystal panel and drive circuits thereof, and the liquid crystal panel typically includes: the active matrix substrate having pixel circuits disposed in a matrix, each of which contains a thin film transistors (hereinafter, simply abbreviated as "TFT") as a switching element and a pixel electrode and the like; an opposite substrate of a transparent, insulating substrate such as a glass plate having an opposite electrode and an alignment film sequentially deposited over the entire surface thereof; a liquid crystal layer held between the both substrates; and polarizers attached to the respective outside surfaces of the both substrates.

FIG. 32 is a plan, view showing a structure of a conventional active matrix substrate 700 used for the liquid crystal display device as described above, and illustrates a pattern configuration in a part corresponding to one pixel. The active matrix substrate 700 includes a plurality of data signal lines 715, a plurality of scanning signal lines 716 intersecting the plurality of data signal lines 715, TFTs 712 formed as the switching elements in the neighborhood of the intersections of the plurality of data signal lines 715 and the plurality of scanning signal lines 716, respectively, and a pixel electrode 717. The scanning signal line 716 works also as the gate electrode of the TFT 712, the source electrode 719 of the TFT 712 is connected to the data signal line 715, and the drain electrode 708 is connected to the pixel electrode 717 via a drain extraction electrode 707. A hole is formed in an insulating film disposed between the drain extraction electrode 707 and the pixel electrode 717 and thereby a contact hole 710 is formed connecting the drain extraction electrode 707 and the pixel electrode 717. The pixel electrode 717 is a transparent electrode made of ITO (Indium Tin Oxide) or the like and transmits light from the back of a liquid crystal panel including the active matrix substrate 700 (backlight).

In the active matrix substrate 700, the TFT 712 is turned on by a gate-on voltage of a scanning signal applied to the scanning signal line 716 (conductive state between the source electrode 719- and the drain electrode 708), a data signal applied to the data signal line 715 in this state is written into a pixel capacitance (capacitance, formed by the pixel electrode 717 and the opposite electrode) via the source electrode 719, the drain electrode 708, and the drain extraction electrode 707. Note that, in the active matrix substrate 700, a storage capacitance line 718 is formed along the scanning signal line 716 and the storage capacitance line 718 has a function of avoiding self discharge of the liquid crystal layer during an OFF period in the TFT 712, or the like.

The liquid crystal display device using such an active matrix substrate 700 is typically driven by an alternating voltage for preventing the deterioration of display quality, and a technique is proposed (e.g., Japanese Patent Application Laid-Open Publication No. 8-43795 (Patent document 2)), in which a positive polarity voltage and a negative polarity voltage are applied to the pixel electrode alternately at a fixed time interval with an opposite voltage as a reference potential, the opposite voltage being applied on the opposite electrode (also called "common electrode") provided on the opposite substrate opposite to the active matrix substrate 700 sandwiching the liquid crystal layer, and the polarity inverts every two horizontal periods, for example (hereinafter, called "2H inversion drive").

However, while in the drive of the first line of the two lines which are a unit for the polarity inversion in this 2H inversion drive, the polarity of the applied voltage to the data signal line is inverted immediately before the drive of the first line is started, the polarity of the applied voltage to the data signal line is not inverted when the drive is shifted from the first line to the second line in the two lines. Therefore, the drive of the first line requires a longer time for charging the data signal line compared to the drive of the second line, and resultantly a difference of charged amount in the pixel capacitance is caused between the first line and the second line. This difference of the charged amount appears as a luminance difference between a pixel in the Nth line corresponding to the first line of the polarity inversion unit and a pixel in the (N+1)_th line corresponding to the second line of the polarity inversion unit in one frame and causes horizontal line irregularity to be viewed.

Accordingly, there is proposed a method to make uniform the charging characteristic by applying the data signal exhibiting a certain intermediate potential between the positive polarity and negative polarity potentials during a blanking period for every horizontal period (Japanese Patent Application Laid-Open Publication No. 2004-61590 (Patent document 3))

Patent document 1: Japanese Patent Application Laid-Open Publication No. 9-152625
Patent document 2: Japanese Patent Application Laid-Open Publication No. 8-43795
Patent document 3: Japanese Patent Application Laid-Open Publication No. 2004-61590
Patent document 4: Japanese Patent Application Laid-Open Publication No. 9-243998
Patent document 5: Japanese Patent Application Laid-Open Publication No. 2002-268613
Patent document 6: Japanese Patent Application Laid-Open Publication No. 11-30975

DISCLOSURE OF THE INVENTION

Problems to be Solved by the Invention

Meanwhile, in an active matrix type liquid crystal display device employing a dot inversion drive method in which the polarity of the data signal applied to the data signal line of the liquid crystal panel, is inverted for every one or two horizontal periods and also for every data signal line, there is a case to employ a method to cause a short-circuit between the neighboring data signal lines when the polarities of the data signals S(1) to S(N) are inverted (hereinafter, called "charge sharing method") for reducing power consumption (e.g., Japanese Patent Application Laid-Open Publication No. 9-243998 (Patent document 4)). In the above active matrix type liquid crystal display device, there is another case to employ a method to cause each data signal line to be short-circuited to the common electrode (to the common potential) when the polarities of the data signals S(1) to S(N) are inverted (hereinafter, called "common potential short-circuit method") for reducing power consumption (e.g., Japanese Patent Application Laid-Open Publication No. 11-30975 (Patent document 6)), instead of employing the charge sharing method.

When the charge sharing method is employed in the liquid crystal display device using the dot inversion drive method which inverts the polarity of the data signal every two horizontal periods (hereinafter, called "2H dot inversion drive method"), the neighboring data signal lines are short-circuited every two horizontal periods. Therefore, also in this case, the difference of the charged amount occurs between the two lines of the polarity inversion unit and sometimes causes the horizontal line irregularity to be viewed. Also when the common potential short-circuit method is employed in the liquid crystal display device using the 2H dot inversion drive method, for the same reason the horizontal line irregularity is sometimes caused to be viewed.

In the liquid crystal display device using such a 2H dot inversion drive method, it is possible to make uniform the charging characteristic (elimination of the charged amount difference in the pixel capacitance) in the two lines of the polarity inversion unit by causing a short-circuit between the neighboring data signal lines not every two horizontal periods but every one horizontal period as same as in the technique disclosed by Japanese Patent Application Laid Open Publication No. 2004-61590 (above Patent document 3). However, between the first line and the second line in the two lines of the polarity inversion unit there is a difference in the time elapsed before the charge is re-distributed and the potential of each data signal line settles to a certain value by the short-circuit. Accordingly, in the period when the neighboring data signal lines are short-circuited for the charge re-distribution (hereinafter, called "charge sharing period"), as shown in the FIG. 13 the voltage Vs of the data signal line does not reach the above certain value, that is, a middle value of the data signal line potential (hereinafter, called "source center potential"), and there is a difference between the potential of the first line immediately after the charge sharing period before the drive starts and the potential of the second line immediately after the charge sharing period before the drive starts. In this case, the difference in the charged amount of the pixel capacitance between the first line and the second line is not eliminated sufficiently, and the horizontal line irregularity is viewed sometimes.

Further, in the liquid crystal display device employing the 2H dot inversion drive, by short-circuiting each of the data signal lines to a common potential not every two horizontal periods but every one horizontal period, it is possible to make uniform the charging characteristic of the two lines of the polarity inversion unit as in the technique disclosed in Japanese Patent Application Laid-open Publication No. 2004-61590 (above Patent document 3). Also in this case, however, in a period during which each of the data signal lines is short-circuited to the common potential (hereinafter, called "common potential short-circuit period") for discharging, the voltage Vs of the data signal line does not reach the common potential and there is a difference between the potential of the first line immediately after the charge sharing period before the drive start and the potential of the second line immediately after the charge sharing period before the drive start. As a result, the difference in the charge amount of the pixel capacitance between the first line and the second line is not sufficiently eliminated and the horizontal line irregularity is still viewed sometimes.

Recently, a resolution has been improved in the active matrix type display device such as the liquid crystal display device and there is a case of employing a method to increase a drive frequency for improving a moving picture performance or the like. Accordingly, the charging time, which can be secured for writing pixel, data into the pixel capacity, tends to become shorter. When the charging time becomes shorter, there is a concern that right pixel data is not written into the pixel capacitance because of shortage of the charging and also it becomes difficult to secure a sufficient charge sharing period or a common potential short-circuit period. Thus, there arises evidently the above described problem in the liquid crystal display device using the 2H dot inversion drive method. Further, when the potential of each of the data signal lines does not reach the source center potential or the common potential because the sufficient charge sharing period or the sufficient common potential short-circuit period can not be secured, the phenomena thereof also causes worsening the shortage of the charging. Such a problem of the shortage in charging resulting from the resolution improvement or the drive frequency increase occurs similarly as in the liquid crystal display device using the 1H dot inversion drive method.

For this problem, Japanese Patent Application Laid-Open Publication No. 2002-268613 (Patent document 5) discloses a liquid crystal display device in which a switching element causing a short-circuit between neighboring data lines is formed in the neighborhood of an edge part of a liquid crystal panel on the farther side from a data driver (may also be called "data signal line drive circuit" or "source driver"). With such a configuration, it is possible to improve distortion of a data line voltage which increases as the distance between the data line and the data driver increases, and thereby it is possible to alleviate or eliminate the problem that parasitic capacitance increases and the data voltage is not sufficiently charged to the data line as the size of the liquid crystal display device increases. Further, it is possible to charge the data voltage sufficiently to the data line compared to the conventional liquid crystal display device which does not employ the charge sharing method. However, this configuration can not solve the above described problem of the shortage in charging caused by the improvement of the resolution or the increase of the drive frequency.

As described above, in the conventional liquid crystal display device using the active matrix substrate, it becomes difficult to display a good image because of the difference in the charged amount or the shortage of charging in the pixel capacitance, when a larger size or a higher resolution is employed and the drive frequency thereof is increased.

Accordingly, an object of the present invention is to provide an active matrix substrate without the deterioration of display quality even when a larger size or a higher resolution is employed and the drive frequency is increased. Further, another object of the present invention is to provide an active matrix type display device without the deterioration of display quality even when a larger size or a higher resolution is employed in the display device and the drive frequency thereof is increased.

Means for Solving the Problems

A first aspect of the present invention provides an active matrix substrate including:
   a plurality of data signal lines;
   a plurality of scanning signal lines intersecting the plurality of data signal lines;
   a pixel switching element provided corresponding to each of intersections of the plurality of data signal lines and the plurality of scanning signal lines, the pixel switching element being turned on and off by the scanning signal line passing through the corresponding intersection;

a pixel electrode connected to the data signal line passing through the intersection corresponding to the pixel switching element via the pixel switching element;

a storage capacitance line disposed along each of the plurality of scanning signal lines so as to form a predetermined capacitance between itself and the pixel electrode;

discharge switching elements connected between each of the plurality of data signal lines and the storage capacitance line so as to cause a short-circuit in its on-state between each of the plurality of data signal lines and the storage capacitance line, predetermined number of two or more of the discharge switching elements being provided for each of the plurality of data signal lines in a direction in which the data signal line extends; and discharge control signal lines for turning on and off the discharge switching elements.

A second aspect of the present invention provides the active matrix substrate according to the first aspect of the present invention, wherein each of the plurality of data signal lines includes first and second signal lines electrically separated from each other, and predetermined number of two or more of the discharge switching elements are provided for each of the first and second signal lines in the direction in which the data signal line extends.

A third aspect of the present invention provides the active matrix substrate according to the first aspect of the present invention, wherein the discharge switching elements are disposed at a substantially equal interval in the direction in which the data signal line extends.

A fourth aspect of the present invention provides the active matrix substrate according to the first aspect of the present invention, wherein the discharge control signal lines include a plurality of control signal lines disposed along the plurality of scanning signal lines, respectively;

the discharge switching elements include a plurality of switching elements provided corresponding to the plurality of control signal lines for each of the plurality of data signal lines; and each of the plurality of switching elements is turned on and off by the corresponding control signal line.

A fifth aspect of the present invention provides the active matrix substrate according to the first aspect of the present invention, wherein the discharge switching elements include a group of switching elements disposed in a neighborhood of one end of the plurality of data signal lines and a group of switching elements disposed in a neighborhood of the other end of the plurality of data signal lines.

A sixth aspect of the present invention provides the active matrix substrate according to the first aspect of the present invention, wherein the storage capacitance line has an extended portion extended in a direction along the data signal line, and the discharge switching element is a thin film transistor having a drain electrode and a source electrode, the drain electrode being connected to the data signal line to be short-circuited to the storage capacitance line when the discharge switching element is in the on-state, and the source electrode being connected to the extended portion via a predetermined source extraction electrode.

A seventh aspect of the present invention provides the active matrix substrate according to the sixth aspect of the present invention, wherein the extended portion and the source extraction electrode constitute a structure disposed in a ring shape along an outer edge of the pixel electrode.

An eighth aspect of the present invention provides the active matrix substrate according to the sixth aspect of the present invention, wherein the extended portion and the source extraction electrode are connected with each other via a conductive electrode formed in a contact hole portion provided in a predetermined interlayer insulating film.

A ninth aspect of the present invention provides the active matrix substrate according to the eighth aspect of the present invention, wherein the conductive electrode is made of the same material as that of the pixel electrode.

A tenth aspect of the present invention provides the active matrix substrate according to the first aspect of the present invention, wherein the storage capacitance line has a ring shape portion including a portion extended along an outer edge of the pixel electrode in parallel to the data signal line and a portion extended along the outer edge of the pixel electrode in parallel to the scanning signal line.

An eleventh aspect of the present invention provides the active matrix substrate according to the first aspect of the present invention, wherein the discharge switching element is disposed so as to overlap with an electrode pattern which forms the discharge control signal line.

A twelfth aspect of the present invention provides the active matrix substrate according to the first aspect of the present invention, wherein:

the discharge switching element is a thin film transistor having first and second drain electrodes and a source electrode, the source electrode being connected to the storage capacitance line; and the first drain electrode being connected to one of the neighboring two data signal lines sandwiching the discharge switching element and the second drain electrode being connected to the other one of the two data signal lines.

A thirteenth aspect of the present invention provides the active matrix substrate according to the first aspect of the present invention, wherein the pixel electrode is disposed so as to overlap with the discharge control signal line.

A fourteenth aspect of the present invention provides a display device, including:

an active matrix substrate according to any of the first to thirteenth aspects of the present invention;

a scanning signal line drive circuit for generating a plurality of scanning signals for selectively driving the plurality of scanning signal lines and for applying the plurality of scanning signals to the plurality of scanning signal lines, respectively;

a data signal line drive circuit for generating a plurality of data signals, which represent an image to be displayed, as voltage signals which invert polarities every predetermined number of horizontal periods and for applying the plurality of data signals to the plurality of data signal lines, respectively;

a potential supply part for applying a predetermined potential to the storage capacitance line; and a discharge control circuit for generating a discharge control signal to be applied to the discharge control signal line so as to cause a short-circuit between each of the plurality of data signal lines and the storage capacitance line for a predetermined period of every one horizontal period.

A fifteenth aspect of the present invention provides the display device according to the fourteenth aspect of the present invention, wherein the data signal line drive circuit generates the plurality of data signals so as to invert the voltage polarities every predetermined number of two or more of horizontal periods.

A sixteenth aspect of the present invention provides the display device according to the fourteenth aspect of the present invention, wherein the data signal line drive circuit:
includes a switch circuit for cutting off the application of the plurality of data signals to the plurality of data signal lines and also short-circuiting the plurality of data signal lines with each other, for the predetermined period of every one horizontal period; and
generates the plurality of the data signals as voltage signals which invert polarities every predetermined number of data signal lines.

A seventeenth aspect of the present invention provides the display device according to the sixteenth aspect of the present invention, wherein the data signal line drive circuit applies the predetermined potential to the plurality of data signal lines when the plurality of data signal lines are short-circuited with each other by the switch circuit.

An eighteenth aspect of the present invention provides the display device according to the fourteenth aspect of the present invention, wherein the data signal line drive circuit includes a switch Circuit for cutting off the application of the plurality of data signals to the plurality of data signal lines and also short-circuiting each of the plurality of data signal lines to the predetermined potential, for the predetermined period of every one horizontal period.

A nineteenth aspect of the present invention provides the display device according to the fourteenth aspect of the present invention, further including a common electrode disposed so as to face each of the pixel electrodes in the active matrix substrate, wherein the potential supply part applies a predetermined common potential to the common electrode and applies the common potential to the storage capacitance line as the predetermined potential.

A twentieth aspect of the present invention provides the display device according to the fourteenth aspect of the present invention, wherein the potential supply part applies a potential corresponding to a center value between a maximum value and a minimum value of the data signal to the storage capacitance line as the predetermined potential.

A twenty-first aspect of the present invention provides the display device according to the fourteenth aspect of the present invention, wherein the predetermined potential is a potential corresponding to a black display, and the scanning signal line drive circuit selectively drives the plurality of scanning signal lines such that each of the plurality of scanning signal lines is in a selected state for an effective scanning period other than the predetermined period at least once in each frame period and the scanning signal line, which was in the selected state for the effective scanning period, is in the selected state for the predetermined period, at least once after a predetermined pixel value holding time has elapsed from a time when the selected state changed to an unselected state and before the scanning signal line is in the selected state for the effective scanning period in the next frame period.

A twenty-second aspect of the present invention provides the display device according to the twenty-first aspect of the present invention, wherein the scanning signal line drive circuit causes the scanning signal line, which was in the selected state for the effective scanning period, to be in the selected state for the predetermined period a plurality of times after the pixel value holding time has elapsed from the time when the selected state changed to the unselected state and before the scanning signal line is in the selected state for the effective scanning period in the next frame period.

A twenty-third aspect of the present invention provides the display device according to the twenty-second aspect of the present invention, wherein a period during which each of the plurality of scanning signal lines is in the selected state for the effective scanning period does not overlap with a period during which any of the plurality of scanning signal lines is in the selected state for the predetermined period.

A twenty-fourth aspect of the present invention provides the display device according to the fourteenth aspect of the present invention, wherein the data signal line drive circuit includes:
a plurality of buffers for outputting the plurality of data signals to be applied to the plurality of data signal lines, respectively; and
a halt control part for halting the plurality of buffers for the predetermined period.

A twenty-fifth aspect of the present invention provides a television receiver, including a display device according to the fourteenth aspect of the present invention.

A twenty-sixth aspect of the present invention provides a drive method of an active matrix substrate including: a plurality of data signal lines; a plurality of scanning signal lines intersecting the plurality of the data signal lines; a pixel switching element provided corresponding to each of intersections of the plurality of data signal lines and the plurality of scanning signal lines, the pixel switching element being turned on and off by the scanning signal line passing through the corresponding intersection; a pixel electrode connected to the data signal line passing through the intersection corresponding to the pixel switching element via the pixel switching element; and a storage capacitance line disposed along each of the plurality of scanning signal lines so as to form a predetermined capacitance between itself and pixel electrode, the drive method of the active matrix substrate including:

a scanning signal line drive step of generating a plurality of scanning signals for selectively driving the plurality of scanning signal lines and applying the plurality of scanning signals to the plurality of scanning signal lines, respectively;

a data signal line drive step of generating a plurality of data signals, which represent an image to be displayed, as voltage signals which invert polarities every predetermined number of horizontal periods and applying the plurality of data signals to the plurality of data signal lines, respectively;

a potential supply step of applying a predetermined potential to the storage capacitance line; and a discharge step of short-circuiting each of the plurality of data signal lines to the storage capacitance line every one horizontal period, wherein the active matrix substrate further includes:

discharge switching elements connected to each of the plurality of data signal lines and the storage capacitance line so as to short-circuit each of the plurality of data signal lines to the storage capacitance line when the discharge switching elements are in its on-state, predetermined number of two or more of the discharge switching elements being provided for each of the plurality of data signal lines in a direction in which the data signal line extends; and discharge control signal lines for turning on and off the discharge switching elements, and wherein in the discharge step, each of the plurality of data signal lines is short-circuited to the storage capacitance line by a signal provided to the discharge control signal line for turning on the discharge switching element for a predetermined period of every one horizontal period.

Advantages of the Invention

According to the first aspect of the present invention, each of the data signal lines is connected to the storage capacitance, line via the plurality of discharge switching elements, and thereby the charge transfer is accelerated between the data signal line and the storage capacitance line for the discharge period when each of the data signal lines is short-circuited to the storage capacitance line. Here, providing the plurality of discharge switching elements for the one data signal line corresponds to breaking up and transferring the charge stored in the one data signal line by each of the discharge switching elements. Thereby, the potential of each of the data signal lines can be made to reach the predetermined potential (potential of the storage capacitance line) in a short time. As a result, it is possible to suppress the deterioration of display quality caused by the difference in the charge amount or shortage of charging in the pixel capacitance, even when a larger size or a higher resolution is employed in the display device using the active matrix substrate and the drive frequency thereof is increased.

In the second aspect of the present invention, each of the data signal lines is composed of the first and second signal lines electrically separated from each other and configured to accommodate a upper-and-lower division drive method, and thereby the active matrix substrate according to this aspect of the present invention is favorable for the display device to aim for improvement in the moving image display performance by increasing the drive frequency. In such an active matrix substrate, since each of the data signal lines is connected to the storage capacitance line via the plurality of discharge switching elements, the charge transfer is accelerated between the data signal line and the storage capacitance line for the discharge period. Thereby, it is possible to suppress the deterioration of display quality caused by the difference in the charge amount or the shortage of charging in the pixel capacitance.

According to the third aspect of the present invention, the discharge switching elements are disposed at a substantially equal interval in the direction in which the data signal line extends, and thereby it is possible to cause the potential of the data signal line to reach the predetermined potential in the discharge period uniformly over the entire active matrix substrate even when a larger size or a higher resolution is employed in the display device.

According to the fourth aspect of the present invention, since the control signal line for discharging is disposed along each of the scanning signal lines and the switching element for discharging is provided corresponding to each of the control signal lines for each of the data signal lines, the switching elements exist for each of the data signal lines in numbers equal to the number of the scanning signal lines and the charge transfer is performed by these switching elements between the data signal line and the storage capacitance line for the discharge period. Accordingly, it is possible to cause the potential of the data signal line to reach the predetermined potential uniformly over the entire active matrix substrate, even when the discharge period is made shorter or a larger active matrix substrate is employed. Further, since the switching element for discharging exists at each pixel and the control signal line exists in each pixel line for turning on and off the switching element, the arrangement of the switching elements and the control signal lines for discharging matches the pixel arrangement of the image to be formed on the active matrix substrate and the regularity of the pixel arrangement is not disturbed by the addition of the switching elements and the control signal lines for discharging.

According to the fifth aspect of the present invention, the charge transfer is performed between the data signal line and the storage capacitance line for the discharge period by the switching element group disposed in the neighborhood of one end of the data signal lines and the switching element group disposed in the neighborhood of the other end of the data signal lines. Accordingly, the potential of the data signal line can be made uniform within the active matrix substrate immediately after the discharge period, compared to a conventional charge sharing method in which the charge transfer between the data signal lines (or between the data signal line and the common electrode) is performed by a switch circuit in the data signal line drive circuit.

According to the sixth aspect of the present invention, the storage capacitance line has the extended portions extended in parallel to the data signal line and thereby it is possible to suppress the influence of the potential changes of other electrodes on the potential of the pixel electrode.

According to the seventh aspect of the present invention, the extended portion of the storage capacitance line and the source extraction electrode of the thin film transistor serving as the discharge switching element constitute the structure disposed in a ring shape along the outer edge of the pixel electrode, and thereby it is possible to suppress the influence of the potential changes of the data signal line and the scanning signal line on the pixel electrode potential.

According to the eighth aspect of the present invention, the extended portion of the storage capacitance line and the source extraction electrode of the thin film transistor are connected with each other via the conductive electrode formed in the contact hole, and thereby each of the data signal lines is connected electrically to the storage capacitance line via the thin film transistor serving as the discharge switching element.

According to the ninth aspect of the present invention, since the extended portion of the storage capacitance line and the source extraction electrode of the thin film transistor for the discharge switching element are connected with each other by the conductive electrode made of the same material as that of the pixel electrode, the electrical connection between the extended portion and the source extraction electrode can be realized using the same process as that of the electrical connection between the drain electrode of the thin film transistor serving as the pixel switching element and the pixel electrode. Thereby, it is possible to connect each of the data signal lines to the storage capacitance line via the discharge switching element, while suppressing increase of the production cost.

According to the tenth aspect of the present invention, the storage capacitance line has the portion extended along the outer edge of the pixel electrode in parallel to the data signal line and the portion extended along the outer edge of the pixel electrode in parallel to the scanning signal line, thereby it is possible to suppress the influence of the potential changes of the data signal line and the scanning signal line on the pixel electrode potential.

According to the eleventh aspect of the present invention, the discharge switching element is disposed so as to overlap with the electrode pattern forming the discharge control signal line, and thereby it is possible to increase the aperture ratio.

According to the twelfth aspect of the present invention, since the first and second drain electrodes of the thin film transistor serving as the discharge switching element are connected to the neighboring two data signal lines, respectively, and the charge transfer is accelerated between the neighboring data signal lines and between each of the data signal lines and the storage capacitance line for the discharge period. Thereby, it is possible to cause the potential of each of the data signal lines to reach the potential of the storage capacitance line in a shorter discharge period.

According to the thirteenth aspect of the present invention, since the pixel electrode is disposed so as to overlap with the discharge control signal line, it is possible to secure a larger area for the pixel portion and thereby to increase the aperture ratio.

According to the fourteenth aspect of the present invention, in the active matrix type display device, each of the data signal lines is short-circuited to the storage capacitance line for the discharge period, when the polarity of the data signal is inverted, to transfer the charge between each of the data signal lines and the storage capacitance line, and thereby power consumption is reduced. Further, while the difference occurs in the charge amount of the pixel capacitance between the two lines of the polarity inversion unit and the horizontal line irregularity is viewed sometimes in the liquid crystal display device using the conventional 2H inversion drive method, for example, in the display device according to this aspect of the present invention, the discharge period, when each of the data signal lines is short-circuited to the storage capacitance line, is provided for each one horizontal period and such charge amount difference and the horizontal line irregularity are suppressed. Further, since each of the data signal lines is connected to the storage capacitance line via the plurality of discharge switching elements, the charge transfer can be performed in a short discharge period between the data signal line and the storage capacitance line. As a result, it is possible to suppress the deterioration of display quality caused by the difference in the charge amount or the shortage of charging in the pixel capacitance, even when a larger size or a higher resolution is employed in the display device and the drive frequency thereof is increased.

According to the fifteenth aspect of the present invention, the period of the polarity inversion in the data signal corresponds to two or more horizontal periods and it is possible to reduce a heat value and power consumption in the data signal line drive circuit. Generally, when the polarity inversion period becomes longer, that is, n becomes larger in the nH dot inversion drive method to be employed, the heat value and the power consumption are reduced more in the data signal line drive circuit. Further, from the same reason as in the fourteenth aspect of the present invention, it is possible to suppress the deterioration of display quality caused by the difference in the charge amount or the shortage of charging in the pixel capacitance, even when a larger size or a higher resolution is employed in the display device and the drive frequency thereof is increased.

According to the sixteenth aspect of the present invention, the data signal is generated as the voltage signal which changes the polarity every predetermined number of data signal lines, and the charge is transferred between the data signal lines when the switch circuit in the data signal line drive circuit short-circuits the data signal lines on the active matrix substrate with each other for the discharge period (predetermined period in one horizontal period). Thereby, the time required for the potential of each of the data signal lines to reach the predetermined potential (potential of the storage capacitance line) in the discharge period is shortened.

According to the seventeenth aspect of the present invention, the predetermined potential is applied to the data lines when the data lines on the active matrix substrate are short-circuited with each other by the switch circuit in the data signal line drive circuit, and thereby the time required for the potential of each of the data signal lines to reach the predetermined potential is further shortened in the discharge period.

According to the eighteenth aspect of the present invention, in addition to the discharge switching elements in the active matrix substrate, the switch circuit in the data signal line drive circuit also short-circuits each of the data signal lines to the predetermined potential for the discharge period (predetermined period in one horizontal period), and thereby the time required for the potential of each of the data signal lines to reach the predetermined potential in the discharge period is shortened.

According to the nineteenth aspect of the present invention, the common potential to be applied to the common electrode is applied also to the storage capacitance line, and thereby it is possible to use the potential supply part in common for the common electrode and the storage capacitance line.

According to the twentieth aspect of the present invention, the potential in each of the data signal lines becomes to have the center value between the minimum value and the maximum value of the data signal immediately after the discharge period, and thereby it is possible to make uniform the charge amount of the pixel capacitance without depending on the polarity of the data signal to be applied to the pixel electrode.

According to the twenty-first aspect of the present invention, the voltage of each of the data signal lines becomes the same as the predetermined potential applied to the storage capacitance line for the discharge period when the plurality of data signal lines on the active matrix substrate are short-circuited to the storage capacitance lines. This means that the voltage of each of the data signal lines becomes to have a value corresponding to a black display (black voltage). Meanwhile, each of the scanning signal lines is in the selected state for the discharge period at least once after the predetermined pixel value holding period has elapsed from the time when the scanning signal line was selected in the effective scanning period for writing a pixel value. Thereby, since a period until the scanning signal line goes into the selected state next in the effective scanning period for writing the pixel value becomes available for a period of the black display, it is possible to insert the black with the same length into all the display lines and to improve the display performance for a moving image by realizing an impulse type drive securing a sufficient black insertion period without shortening the charging time of the pixel capacitance for writing the pixel value. Further, it is not necessary to increase an operation speed of the data signal line drive circuit or the like for inserting the black.

According to the twenty-second aspect of the present invention, the scanning signal line which was in the selected state for the effective scanning period is in the selected state for the discharge period a plurality of times after the pixel value holding period has elapsed from the time when the selected state changed to the unselected state and before the scanning signal line is in the selected state for the effective scanning period in the next frame period. Thereby, it is possible to cause display luminance to be in a sufficient black level in the black display period for the impulse type drive.

According to the twenty-third aspect of the present invention, since the period during which each of the scanning signal lines is in the selected state for the effective period does not overlap with the period during which any of the scanning signal lines is in the selected state for the discharge period, the load of a power supply does not become too heavy for causing the scanning signal line to be in the selected state and waveform deterioration is reduced for pulses included in each of the scanning signals as a pulse for writing the pixel value in the effective scanning period and a pulse for writing the black voltage in the discharge period. Thereby, it is possible to suppress the shortage of charging in the pixel capacitance caused by the waveform deterioration of the pixel value write pulse, while keeping the pixel luminance in a sufficient black level in the black display period.

According to the twenty-fourth aspect of the present invention, the buffers in the data signal line drive circuit are halted for the discharge period when each of the data signal lines is short-circuited to the storage capacitance line, and thereby it is possible to reduce power consumption of the data signal line drive circuit.

DESCRIPTION OF THE REFERENCE SYMBOLS

Figure 1:
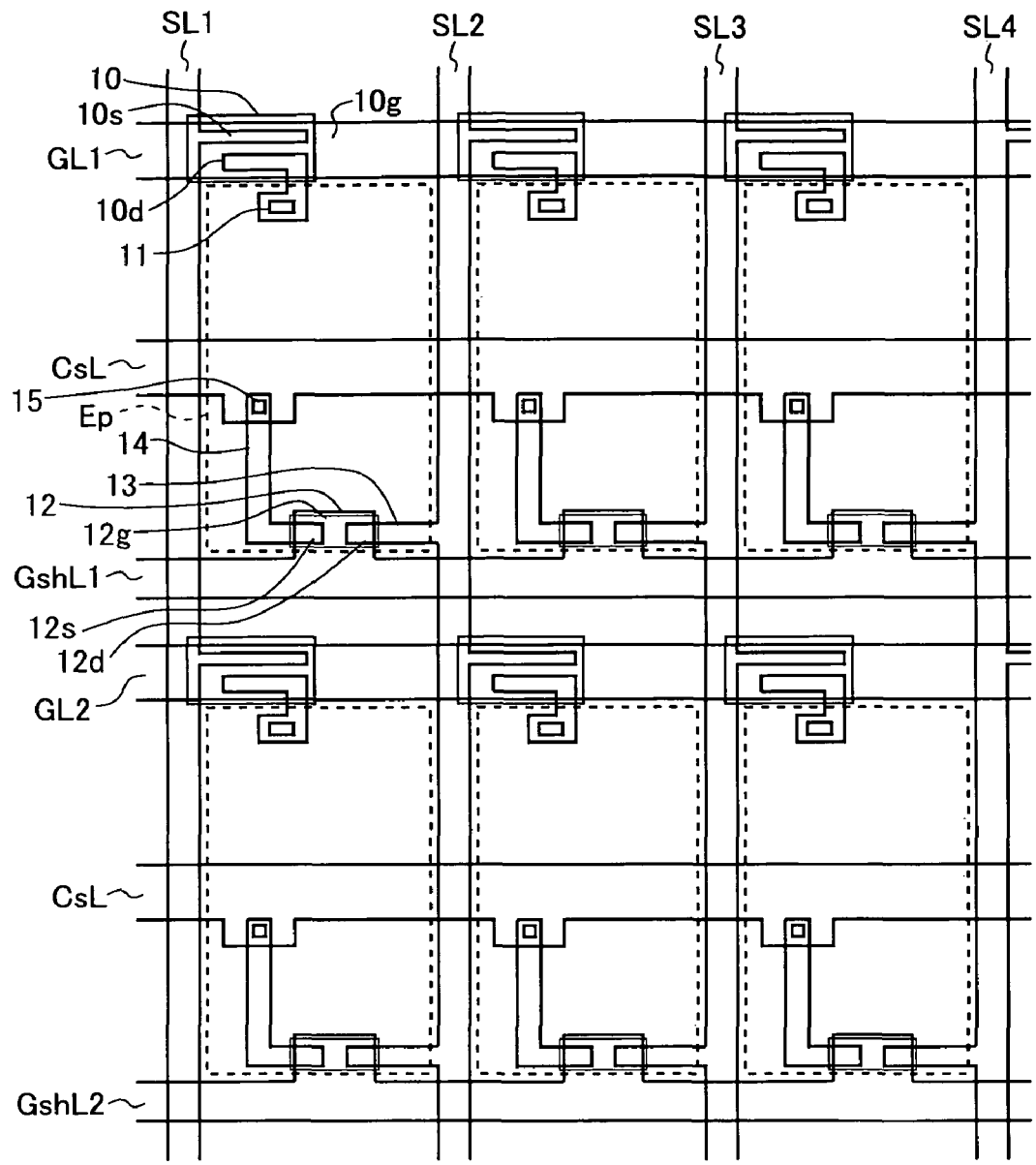
FIG. 1 is a plan view showing a first example of a pattern configuration for an active matrix substrate in a first embodiment of the present invention.

10 Pixel TFT (Pixel switching element)
12 Discharge TFT (Discharge switching element)
12d Drain electrode.
12s Source electrode
14 Source extraction electrode
16a-16e Extended portion (of storage capacitance line)
100 Display part
110, 112, 114, 116 Active matrix substrate
120 Opposite substrate
200 Display control circuit
300 Source driver (Data signal line drive circuit)
302 Data signal generation part 304 Output part
400 Gate driver (Scanning signal line drive circuit)
500 Discharge control circuit
600 Common electrode drive circuit (potential supply part)
Clc Liquid crystal capacitance
Ccs Storage capacitance
Ep Pixel electrode
Ec Common electrode
SWa First MOS transistor
SWb Second MOS transistor
SWb2 Third MOS transistor
SWc Second MOS transistor
SLi Source line (Data signal line) (i=1, 2, . . . , N)
GLj Gate line (Scanning signal line) (j=1, 2, . . . , 2M)
CsL Storage capacitance line (j=1, 2, . . . , 2M)
GshLj Discharge control signal line (j=1, 2, . . . , 2M)
S(i) Data signal (i=1, 2, . . . , N)
G(j) Scanning signal (j=1, 2, . . . , 2M)
Vcom Common potential (Opposite voltage)
Csh Discharge control signal
Gsh Discharge control signal for matrix substrate
Psh Discharge control pulse
Pw Pixel data write pulse
Pb Black voltage application pulse
Tsh Discharge period
Thd Pixel data holding period (Pixel value holding period)

BEST MODES FOR CARRYING OUT THE INVENTION

Hereinafter, embodiments of the present invention will be described with reference to the accompanying drawings.

1. First Embodiment

<1.1 Configuration and Operation>

Figure 8:
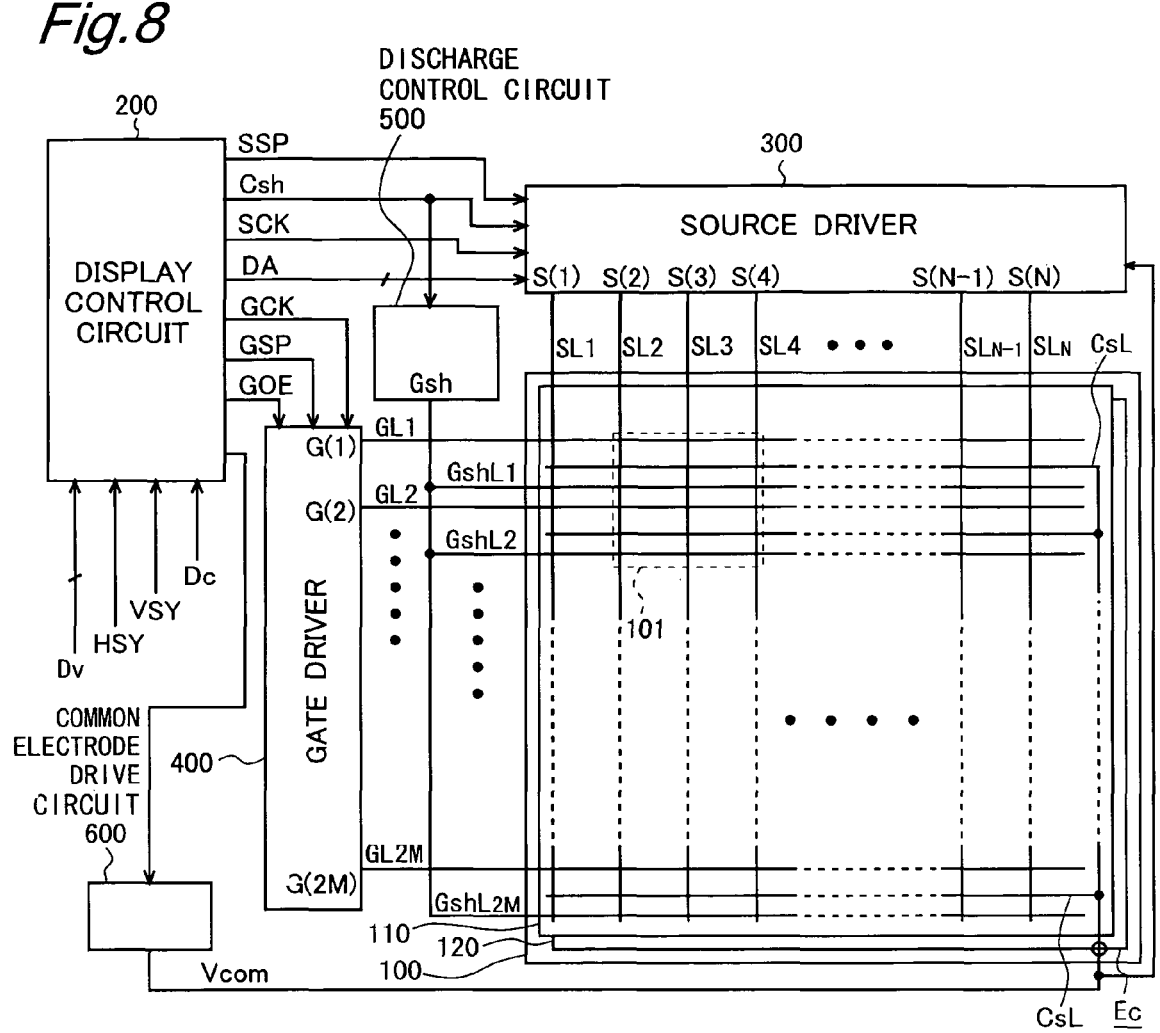
FIG. 8 is a block diagram showing a configuration of a liquid crystal display device according to the first embodiment.
Figure 9:
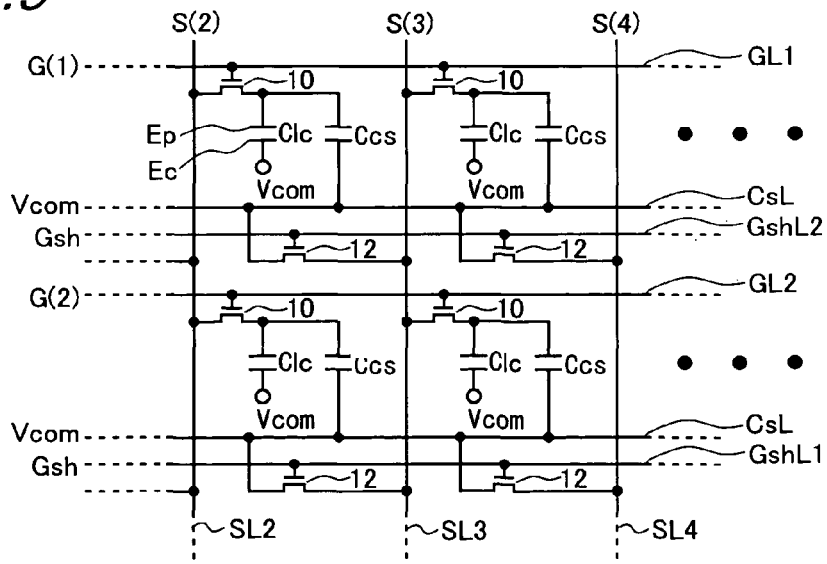
FIG. 9 is an equivalent circuit diagram showing a first example of a circuit configuration of the active matrix substrate in the first embodiment.

A first embodiment will be described for an example of a liquid crystal display device using an active matrix substrate according to the present invention. FIG. 8 is a block diagram showing a configuration of the liquid crystal display device according to the present embodiment. FIG. 9 is a circuit diagram showing an equivalent circuit of the active matrix substrate 110 according to the present embodiment, and shows an electrical configuration of a part (part corresponding to neighboring four pixels) 101 of the active matrix substrate 110.

This liquid crystal display device includes a source driver 300 as a data signal line drive circuit; a gate driver 400 as a scanning signal line drive circuit; a discharge control circuit 500; an active matrix type display part 100 using the active matrix substrate 110; and a display control circuit 200 for controlling the source driver 300, gate driver 400, and discharge control circuit 500.

The display part 100 of the above liquid crystal display device is composed of a pair of electrode substrates sandwiching a liquid crystal layer and has a polarizer attached to each of the electrode substrates on the outer surface thereof. One of the pair of electrode substrates is the active matrix substrate 110. As shown in FIG. 8 and FIG. 9, on an insulating-substrate such as a glass plate of the active matrix substrate 110, there are formed gate lines. GL1 to GL2M as a plurality of (2M) scanning signal lines, source lines SL1 to SLN as a plurality of (N) data signal lines intersecting each of these gate lines GL1 to GL2M, a plurality of (2M×N) pixel circuits provided corresponding to intersections of these gate lines GL1 to GL2M and the source lines SL1 to SLN, respectively, and a plurality of (2M) discharge control signal lines GshL1 to GshL2M. Each of the pixel circuits includes a TFT 10 as a switching element, the gate terminal of which is connected to the gate line GLj passing through the corresponding intersection and the source terminal of which is connected to the source line SLi passing through the intersection, and a pixel electrode Ep connected to the drain terminal (electrode) of the TFT 10.

On the other hand, the other one of the pair of electrode substrates is called an opposite substrate 120 and composed of a transparent insulating substrate such as a glass plate, over the entire surface of which a common electrode Ec is formed. The common electrode Ec and the above liquid crystal layer are provided commonly for the plurality of (2M×N) pixel circuits. Then, each of the pixel circuits on the active matrix substrate 110 constitutes a pixel formation portion together with the commonly provided common electrode Ec and liquid crystal layer, and, in the pixel formation portion, the pixel electrode Ep and the common electrode Ec form a liquid crystal capacitance Clc. Further, typically, a storage capacitance Ccs is provided in parallel to the liquid crystal capacitance Clc in order to hold a voltage of a pixel capacitance Cp securely. Specifically, on the active matrix substrate 110, a storage capacitance line CsL is disposed in parallel to each of the gate lines GLj and the storage capacitance Ccs is formed by the storage capacitance line CsL and the pixel electrode Ep opposite to the storage capacitance line CsL sandwiching an insulating film and the like. Accordingly, the pixel capacitance Cp, in which the data signal S(i) is written and held as pixel data, is composed of the liquid crystal capacitance Clc and the auxiliary capacitance Ccs. Specifically, assume that these symbols "Cp", "dc", "Ccs" also designate capacitance values thereof and Cp=Clc+Ccs.

Further, on the active matrix substrate 110 in the present embodiment there is formed a TFT as a discharge switching element (hereinafter, called "discharge TFT") 12, the gate of which is connected to the discharge control signal line GshLj disposed along each of the gate lines GLj (j=1, 2, . . . , 2M). The source terminal of the discharge TFT 12 is connected to the neighboring storage capacitance line CsL and the drain terminal of the discharge TFT 12 is connected to the neighboring data signal line SLi. All the source lines on the active matrix substrate 110 are short-circuited to the storage capacitance lines CsL when an active signal (voltage turning on the TFT 12) is applied to each of the discharge signal lines GshLj. Specifically, the discharge TFT 12 exists in numbers equal to the number of the gate lines GLj (2M) for each of the source lines SLi, and each of the data signal lines SLi (i=1, 2, . . . , N) is short-circuited to the plurality (M) of storage capacitance lines CsL via the plurality (M) discharge TFTs 12 when the active signal is applied to each of the discharge signal lines GshLj.

As shown in FIG. 8 and FIG. 9, the pixel electrode Ep of each of the pixel formation portions is applied with a potential corresponding to an image to be displayed by the source driver 300 and the gate driver 400 which operate as described below, and the common electrode Ec is applied with a predetermined potential from a common electrode drive circuit 600 as a common potential Vcom (this common potential Vcom is also called "opposite voltage" or "common voltage"). Thereby, a voltage corresponding to the potential difference between the pixel electrode Ep and the common electrode Ec is applied to liquid crystal and image display is performed by control of light transmittance in the liquid crystal layer according to this applied voltage. Note that polarizer plates are used for the control of the light transmittance by the voltage applied to the liquid crystal layer and the polarizer plates are disposed so as to realize a normally-black mode in the liquid crystal display device according to the present embodiment, for example. As shown in FIG. 8, the common voltage Vcom applied to the common electrode Ec is also applied to the storage capacitance line CsL and the source driver 300.

The display control circuit 200 receives, from a external signal source, a digital video signal Dv representing an image to be displayed, a horizontal synchronization signal HSY and a vertical synchronization signal VSY corresponding to the digital video signal Dv, and a control signal Dc for controlling display operation, and generates and outputs the following signals as signals for displaying the image represented by the digital video signal Dv on the display part 100, based on these signals Dv, HSY, VSY, and Dc: a data start pulse-signal SSP, a data clock signal SCK, a discharge control signal Csh, a digital image signal DA representing the image to be displayed (signal corresponding to the video signal Dv), a gate start pulse signal GSP, a gate clock signal GCK and a gate driver output control signal GOE. In more detail, after timing adjustment and the like are performed as needed with an internal memory, the video signal Dv is outputted as the digital image signal DA from the display control circuit 200, the data clock signal SCK is generated as a signal composed of a pulse corresponding to each pixel of the image represented by the digital image signal DA, the data start pulse signal SSP is generated as a signal which exhibits a high level (H level) for a predetermined period for each one horizontal period based on the horizontal synchronization signal HSY, the gate start pulse signal GSP is generated as a signal which exhibits the H level for a predetermined period in each one frame period (one vertical scanning period) based on the vertical synchronization signal VSY, the gate clock signal GCK is generated based on the horizontal synchronization signal HSY, and the discharge control signal Csh and the gate driver output control signal GOE are generated based on the horizontal synchronization signal HSY and the control signal Dc.

Among the signals generated in the display control circuit 200 as described above, the digital image signal DA, the discharge control signal Csh, the data start pulse signal SSP, and the data clock signal SCK are inputted into the source driver 300, and the gate start pulse signal GSP, the gate clock signal GCK, and the gate driver output control signal GOE are inputted into the gate driver 400. Further, the discharge control signal Csh is inputted also into the discharge control circuit 500.

The source driver 300, using the digital image signal DA, the data start pulse signal SSP and the data clock signal SCK, generates data signals S(1) to S(N) of analog voltages corresponding to pixel values in each horizontal scanning line of the image represented by the digital image signal DA for every one horizontal period (every 1H), and applies these data signals S(1) to S(N) to the source lines SL1 to SLN, respectively.

The present embodiment employs a drive method in which the data signals S(1) to S(N) are outputted such that the polarity of the voltage applied to the liquid crystal layer is inverted every one frame period and also inverted every n gate lines (n is two or more) and every one source line, that is, an nH dot inversion drive method. Accordingly, the source driver 300 inverts the polarities of the applied voltages to the source lines SL1 to SLN every one source line and also inverts the polarity of the data signal S(i) applied to each of the source lines SLi every n horizontal periods. Here, a reference potential for the polarity inversion of the applied voltage to the source line is a DC level (potential corresponding to a DC component) of the data signals S(1) to S(N), and this DC level is not generally the same as the DC level of the common electrode Ec and is different from the DC level of the common electrode Ec by a pull-in voltage ΔVd, caused by a parasitic capacitance Cgd between the gate and drain of the TFT in each of the pixel formation portions. Note that, when the pull-in voltage ΔVd caused by the parasitic capacitance Cgd is sufficiently small compared to an optical threshold voltage Vth of the liquid crystal, the DC level of the data signals S(1) to S(N) is assumed to be the same as the DC level of the common electrode Ec and the polarities of the data signals S(1) to S(N), that is, the polarities of the applied voltages to the source lines can be assumed to be inverted every n horizontal periods with the potential Vcom of the common electrode Ec as a reference.

Figure 10:
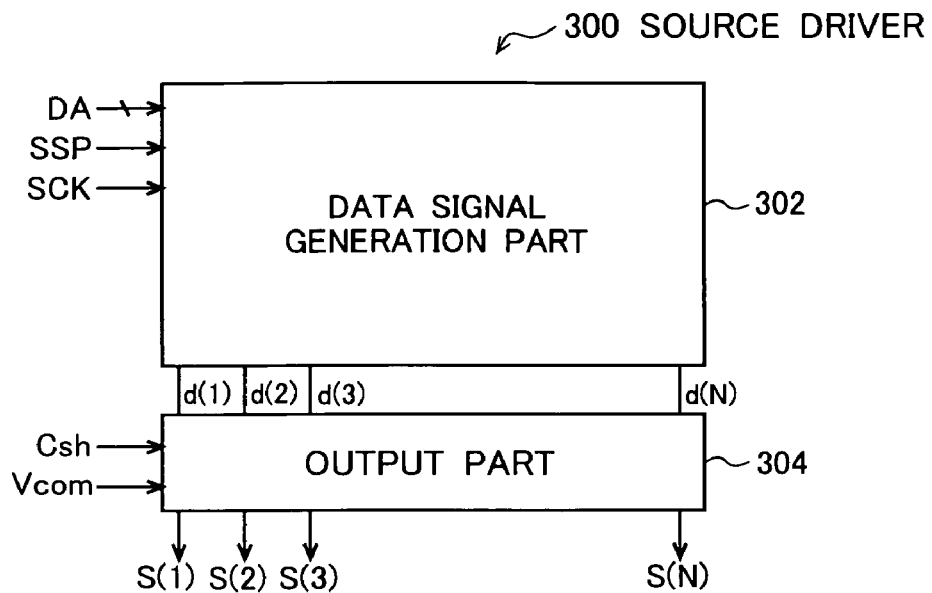
FIG. 10 is a block diagram showing a configuration of a source driver in the liquid crystal display device according to the first embodiment.

FIG. 10 is a block diagram showing a configuration of the source driver in the present embodiment. This source driver is composed of a data signal generation part 302 and an output part 304. The data signal generation part 302 generates analog voltage signals d(1) to d(N) corresponding to the respective source lines SL1 to SLN from the digital image signal DA based on the data start pulse signal SSP and the data clock signal SCK. The configuration of the data signal generation part 302 is the same as that of a conventional source driver and description thereof will be omitted. The output part 304 performs impedance conversion on the analog voltage signal d(i) generated in the data signal generation part 302 and outputs the analog voltage signal d(i) as the data signal S(i) (i=1, 2, . . . , N).

Figure 11:
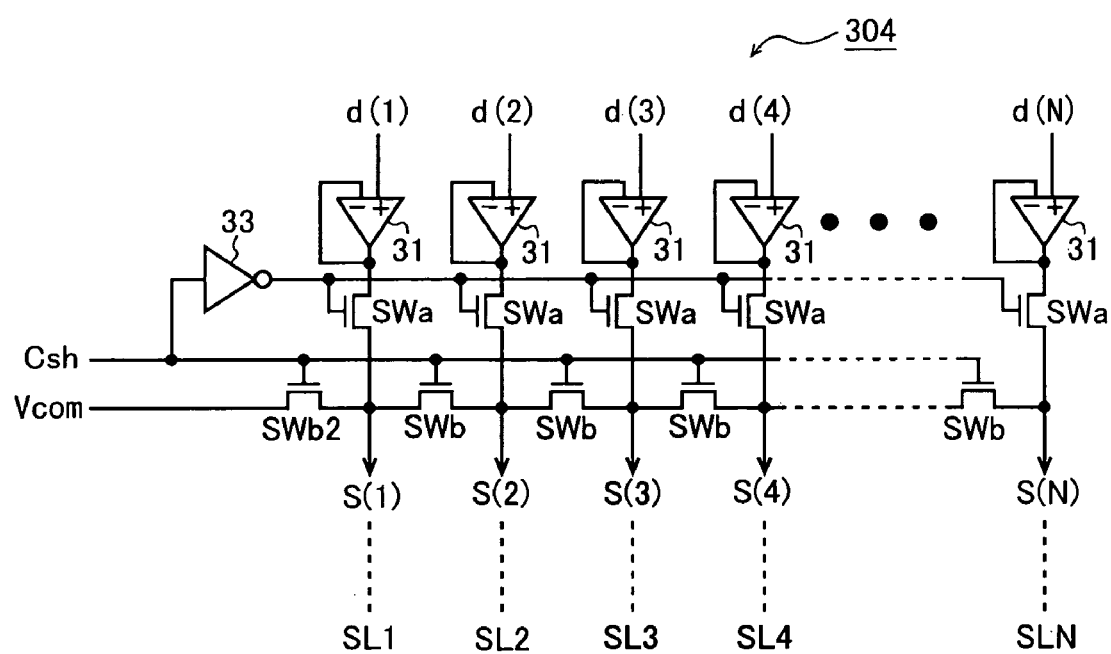
FIG. 11 is a circuit diagram showing a first configuration example of an output part of the above source driver.

Further, the source driver 300 employs the charge sharing method in which the neighboring source lines are short-circuited every one horizontal period for reducing power consumption and for improving horizontal line irregularity in the nH dot inversion drive operation. For this purpose, the output part 304 of the source driver 300 is configured as shown in FIG. 11. Specifically, the output part 304 receives the analog voltages d(1) to d(N) generated from the digital image signal DA, generates the data signals S(1) to S(N) as image signals to be transmitted to the source lines SL1 to SLN by performing the impedance conversion on these analog voltage signals d(1) to d(N), and includes N output buffers 31 serving as voltage followers for this impedance conversion. The output terminal of each of the buffers 31 is connected with a first MOS transistor SWa serving as a switching element, and the data signal S(i) from each of the buffers 31 is outputted from the output terminal of the source driver 300 via the first MOS transistor SWa (i=1, 2, . . . , N). Further, the neighboring output terminals of the source driver 300 are connected with each other by a second MOS transistor SWb serving as a switching element (thereby, the neighboring source lines are connected with each other by the second MOS transistor SWb). Then, the discharge control signal Csh is inputted from the display control circuit 200 as a control signal for the charge sharing. To the gate terminal of the second MOS transistor SWb between these output terminals, the discharge control signal Csh is provided, and to the gate terminal of the first MOS transistor SWa connected to the output terminal of each of the buffers 31, an output signal of an inverter 33, that is, a logically inverted signal of the discharge control signal Csh is provided.

Further, the source driver 300 includes a third MOS transistor SWb2 serving as a switching element and the discharge control signal. Csh is also provided to the gate terminal of the third TFT SWb2. The common potential Vcom provided to the common electrode Ec is connected via the third TFT SWb2 to the output terminal of the source driver to be connected to any one of the source lines SL(i) (in an example as shown in FIG. 11 the common potential Vcom is connected to the output terminal to be connected to the first source lines SL1).

According to the above configuration, when the discharge control signal Csh is not active (low level), the first MOS transistors SWa are turned on (conduction state) and the second MOS transistors SWb are turned off (cut-off state), and thereby the data signal from each of the buffers 31 is outputted from the source driver 300 via the first MOS transistor SWa. On the other hand, when the discharge control signal Csh is active, (high level), the first MOS transistors SWa are turned off (cut-off state) and the second MOS transistors SWb are turned on (conduction state), and thereby the data signal from each of the buffers 31 is not outputted (i.e., the application of the data signals S(1) to S(N) to the source lines SL1 to SLN is cut off) and the neighboring source lines in the display part 100 are short-circuited via the second MOS transistors SWb. At this time the source line SL1 is provided with the common potential Vcom via the third MOS transistor SWb2. Note that as seen form the configuration in FIG. 9 each of the source lines SL1 to SLN is provided with the common potential Vcom also via the discharge TFTs 12 on the active matrix substrate 110 at this time.

Figure 12:
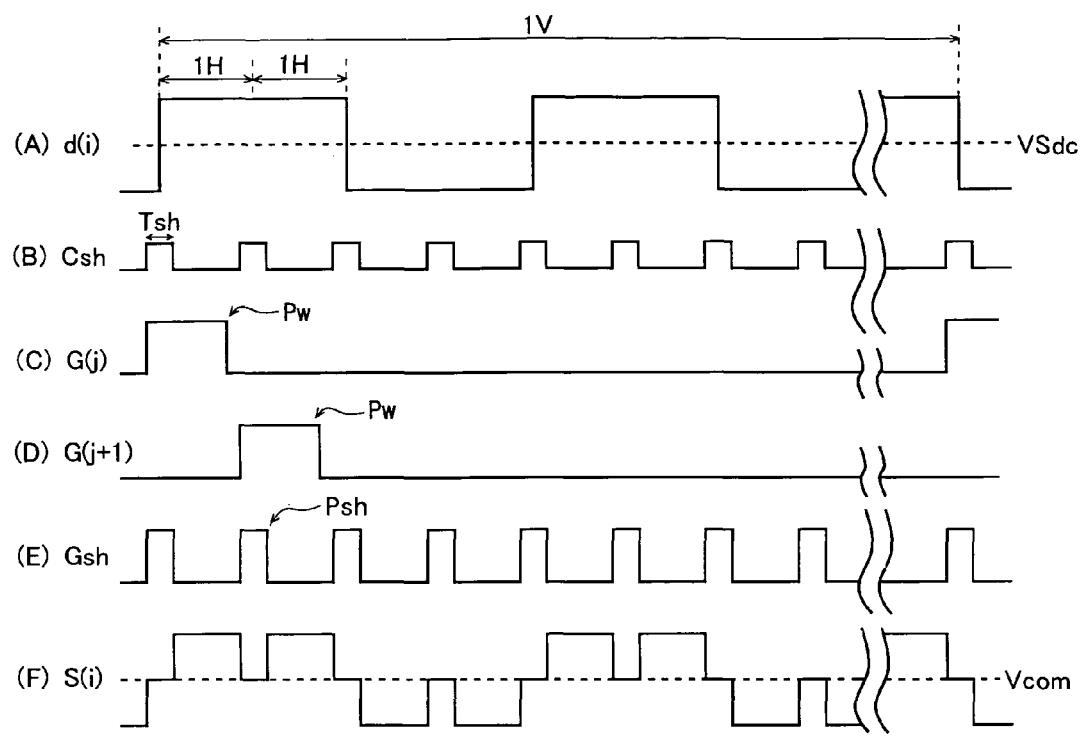
FIG. 12 consists of signal waveform charts (A) to (F) for explaining the operation of the liquid crystal display device according to the first embodiment.

The source driver 300 of the present configuration generates the analog voltage signal d(i) as a video signal whose polarity is inverted every n horizontal periods (nH), here, two horizontal periods (2H) for n=2, as shown in (A) of FIG. 12, and the display control circuit 200 generates the discharge control signal Csh which exhibits the high level (H level) during such a short period Tsh as one horizontal blanking period of each of the analog voltage signals d(i) as shown in (B) of FIG. 12. The period during which the discharge control signal Csh exhibits the H level is a period during which the neighboring data signal lines are short-circuited for the charge re-distribution and called a "charge sharing period". On the other hand, during this period Tsh, in the active matrix substrate 110 each of source lines SL1 to SLN is short-circuited to the storage capacitance lines CsL via the discharge TFTs 12 and the charge accumulated in a wiring capacitance of each of source lines SL1 to SLN (called "accumulated charge of each source line SL1 to SLN" for simplicity) is discharged. Thus, the period Tsh is hereinafter called "discharge period".

As described above, in the source driver 300 each of the analog voltage signals d(i) is outputted as the data signal S(i) when the discharge control signal Csh exhibits the low level (L level), and the application of the data signals S(1) to S(N) to the source lines SL1 to SLN is cut off and also the neighboring source lines are short-circuited with each other when the charge sharing control signal Csh exhibits the H level. Since the present configuration employs the nH dot inversion drive method and the voltages of the neighboring source lines have polarities opposite to each other, the value exhibited by each of the data signals S(i), that is, the voltage of each of the source lines SLi changes toward a certain intermediate potential between the positive and negative polarity potentials in the discharge period (the charge sharing period) Tsh. Further, as described above each of the source lines SL1 to SLN is provided with the common potential Vcom for the discharge period Tsf and thereby a value of each data signal S(i), that is, a voltage of each source line SLi becomes equal to the common potential Vcom.

Figure 14:
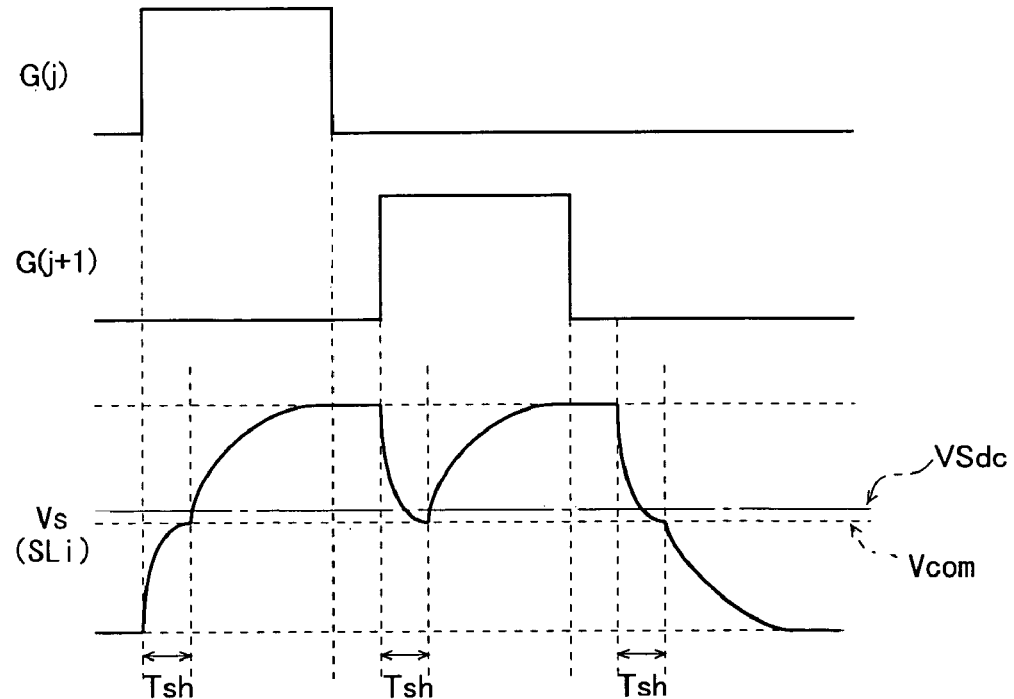
FIG. 14 is a detailed signal waveform chart for explaining the operation of the active matrix substrate in the first embodiment.

In the present liquid crystal display device, each of the data signals S(i) changes the polarity with a DC level VSdc of the data signal S(i) as a reference and the DC level VSdc is close to the common potential Vcom. Then, each data signal S(i) becomes to exhibit approximately the same level as the common potential Vcom (that is, as DC level VSdc of the data signal S(i)) through the charge sharing operation and the operation to short-circuit the source lines SL1 to SLN to the common potential Vcom during the discharge period Tsh as shown in (F) of FIG. 12. Note that an ideal data signal waveform is described here, and, in an actual case, the potential Vs of the source line can reach the common potential Vcom in the discharge period Tsh, as shown in FIG. 14 to be described below, through an operation of the charge sharing TFT 12 connected to the discharge control signal line GshLj to be described below. Incidentally, a configuration to make the voltage of each of the source lines equal to the DC level VSdc of the data signal S(i) by short-circuiting the neighboring source lines when the polarity of the data signal is inverted, is not limited to the configuration shown in FIG. 11.

The gate driver 400 selects sequentially one of the gate lines GL1 to GL2M for approximately one horizontal period in each frame period (each vertical scanning period) of the digital image signal DA in order to write the data signals (1) to S(N) into the respective pixel formation portions (pixel capacitance Cp of the pixel formation portion) based on the gate start pulse signal GSP, the gate clock signal GCK, and the gate driver output control signal GOE. Specifically, the gate driver 400 applies the scanning signals G(1) to G(2M), including pixel data write pulses Pw as shown in (C) and (D) of FIG. 12, to the gate lines GL1 to GL2M, respectively. Thereby, the gate line GLj, to which the pulse Pw is applied, goes into a selected state and the pixel TFT 10 connected to the gate line GLj in the selected state becomes on-state (pixel TFT 10 connected to the gate line in an unselected state becomes off-state). Here, the pixel data write pulse Pw exhibits the H level during the effective scanning period corresponding to a display period in one horizontal period (1H).

While a certain pixel TFT 10 is in the on-state by the application of the pixel data write pulse Pw, the potential of the source line SLi connected to the source terminal of the pixel TFT is provided to the pixel electrode Ep via the pixel TFT 10. Thereby the data signal S(i), that is, the voltage of the source line SLi is written into the pixel capacitance Cp corresponding to the pixel electrode Ep. Subsequently, when the pixel TFT 10 becomes off-state, the voltage written into the pixel capacitance Cp is held as the pixel data in the pixel capacitance Cp until the next pixel data write pulse Pw is applied to the gate line GLj connected to the pixel TFT (until the next selection of the gate line GLj).

The discharge control circuit 500 generates the discharge control signal Gsh for the active matrix substrate, which includes a discharge control pulse Psh as shown in (E) of FIG. 12, based on the discharge control signal Csh from the display control circuit 200, and applies the discharge control signal Gsh to each of the discharge control signal lines GshL1 to GshL2M. Thereby, the discharge control signal lines GshL1 to GshL2M are selected at the same time and all the discharge TFTs 12 become on-state for the discharge period Tsh. Here, the discharge control pulse Psh exhibits the H level for the discharge period Tsh corresponding to the blanking period in one horizontal period (1H).

The common electrode drive circuit 600, applies the common potential Vcom of the predetermined fixed potential to the common electrode Ec on the opposite substrate 120 and also the storage capacitance line CsL on the active matrix substrate 110 under the control of the display control circuit 200. Accordingly, this common electrode drive circuit 600 also has a function of the storage capacitance line drive circuit. More specifically, this common electrode drive circuit 600 functions as a potential supply part for applying the common potential Vcom to the common electrode Ec as a first predetermined potential and also applying the common potential Vcom to the storage capacitance line CsL as a second predetermined potential. Note that, while the first and second predetermined potentials are the same in the present embodiment, the first and second predetermined potentials may be different as described hereinafter.

<1.2 Advantages>

Figure 13:
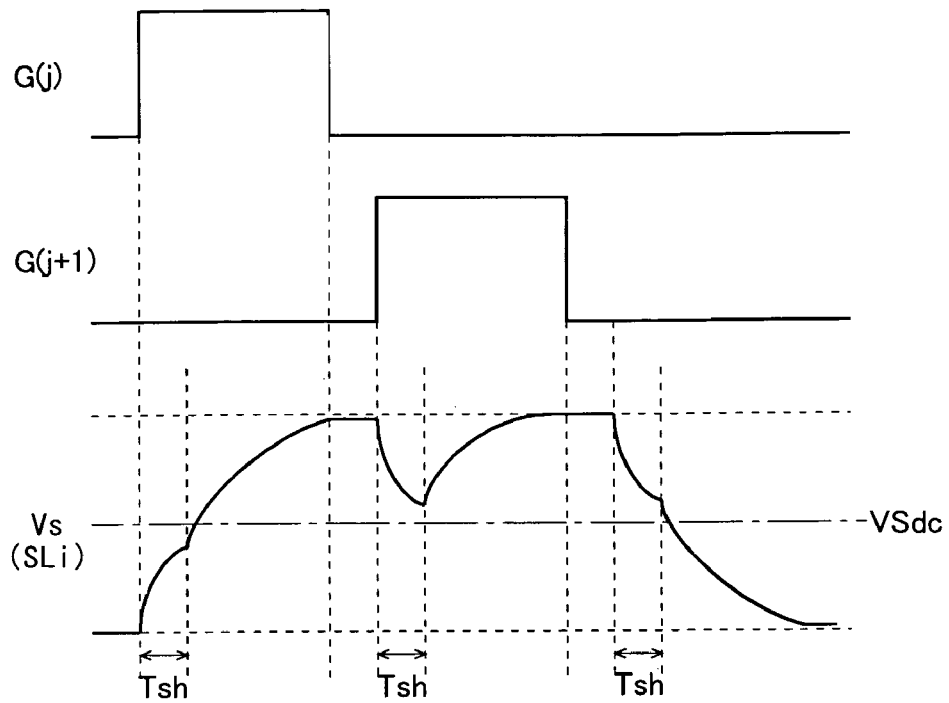
FIG. 13 is a detailed signal waveform chart for explaining the operation of an active matrix substrate in a conventional liquid crystal display device with a 2H dot inversion drive employing a charge sharing method or a common potential short-circuit method.

FIG. 13 is a detailed signal waveform chart showing an operation of an active matrix substrate in a conventional liquid crystal display device with a 2H dot inversion drive employing the charge sharing method. In the conventional liquid crystal display device, since the voltage Vs of each of the source lines SLi does not reach the intermediate potential VSdc within the charge sharing period Tsh, a difference is caused in the charged amount of the pixel capacitance between a first line and a second line in two lines of a polarity inversion unit and this difference sometimes appears in luminance difference to cause horizontal line irregularity to be viewed.

On the other hand, in the present embodiment, for the discharge period corresponding to the above charge sharing period, in addition to the charge sharing operation in the output part 304 of the source driver 300 (refer to FIG. 11 and the like) and the operation to short-circuit to the common potential Vcom, each of source lines SL1 to SLN is short-circuited to the storage capacitance lines CsL via the discharge TFTs 12 connected to the respective discharge control lines GshLj in the active matrix substrate 110. As a result, as shown in FIG. 14, the potential Vs of each of the source lines SLi reaches the common potential Vcom in the discharge period Tsh and thereby the occurrence of the horizontal irregularity can be suppressed. More specifically, such a discharge operation enables each of the source lines SLi to reach the common potential Vcom in the active matrix substrate 110 in shorter time than in a conventional active matrix substrate. Therefore, it is possible to suppress the deterioration of display quality caused by the difference in the charge amount or shortage of charging in the pixel capacitance, even when a larger size or a higher resolution is employed in the display device and the drive frequency thereof is increased.

Further, in the present embodiment, the discharge TFT 12 exists for each pixel, and the discharge control signal line GshLj for turning on and off the discharge TFT 12 exists for each one pixel line. Thereby, these dispositions of the discharge TFT 12 and the discharge control signal line GshLj match the pixel arrangement of the image to be formed on the active matrix substrate 110 and the addition of the discharge TFT 12 and the discharge control signal line GshLj does not disturb the regularity of the pixel arrangement.

<1.3 Pattern Configuration of Active Matrix Substrate>

Next, with reference to FIG. 1 to 7, pattern configurations for realizing the liquid crystal display device according to the above embodiment will be described.

FIG. 1 is a plan view of a first example of a pattern configuration for the active matrix substrate 110 according to the present embodiment and illustrates a pattern configuration in a part corresponding to six pixels. A pixel TFT 10 is provided in the neighborhood of the intersection of the gate line GLj and the source line SLi (i=1, 2, . . . , N, and j=1, 2, . . . , 2M). In this example, the gate line GLj also works as the gate electrode (terminal) 10g of the pixel TFT 10, the source electrode (terminal) 10s of the pixel TFT 10 is connected to the source line SLi, and the drain electrode (terminal) 10d is connected to the pixel electrode Ep via a contact hole 11 provided in an interlayer insulating film.

Further, the discharge control signal line GshLj is disposed so as to be along the gate line GLj, and the discharge TFT 12 is provided in the neighborhood of the discharge control signal line GshLj. The gate electrode (terminal) of the discharge TFT 12 is connected to the discharge control signal line GshLj and, the source electrode (terminal) of the discharge TFT 12 is connected to the storage capacitance line CsL via a source extraction electrode 14 and contact hole 15, and the drain electrode (terminal) of the discharge TFT 12 is connected to the neighboring source line SLi. A plurality of the discharge control signal lines GshLj are preferably provided in a display area. As described above, in this example the discharge control signal lines GshLj are provided in numbers equal to the number of the gate lines GLj.

In the example of FIG. 1, the source extraction electrode 14 and a drain extraction electrode 13 which are connected to the source electrode 12s and the drain electrode 12d of the discharge TFT 12, respectively, do not overlap with the discharge control signal line GshLj. With such a configuration, when the discharge TFT 12 is always in a conduction state caused by a defect such as a film residual in a channel portion of the discharge TFT 12 (case of TFT short-circuit fault), it becomes possible to repair the short-circuit fault by cutting the source extraction electrode 14 or the drain extraction electrode 13. Further, it is possible to reduce a probability of short-circuit between the discharge control signal line GshLj and the source line SLi.

Figure 2:
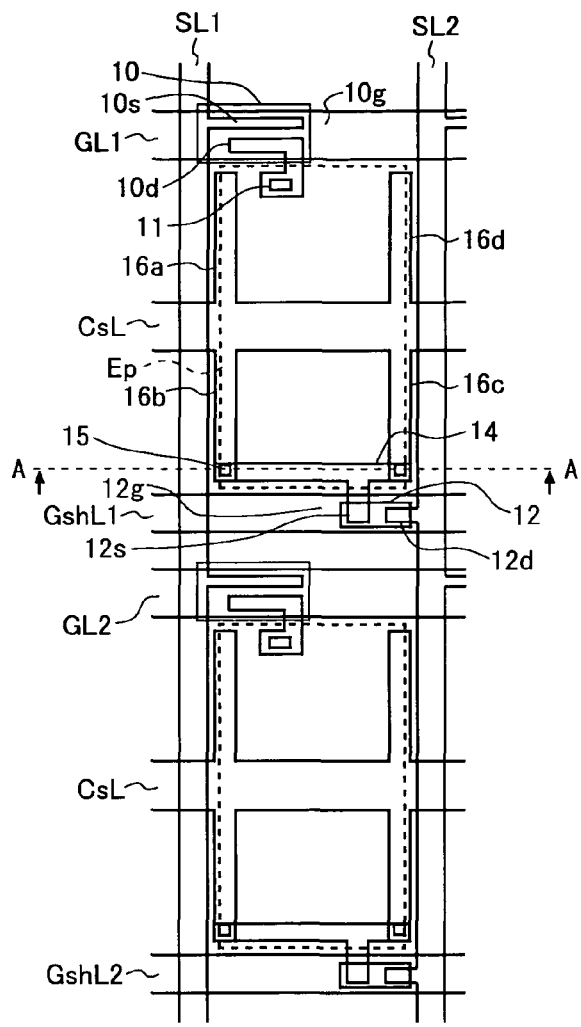
FIG. 2 is a plan view showing a second example of the pattern configuration for the active matrix substrate in the first embodiment.
Figure 3:
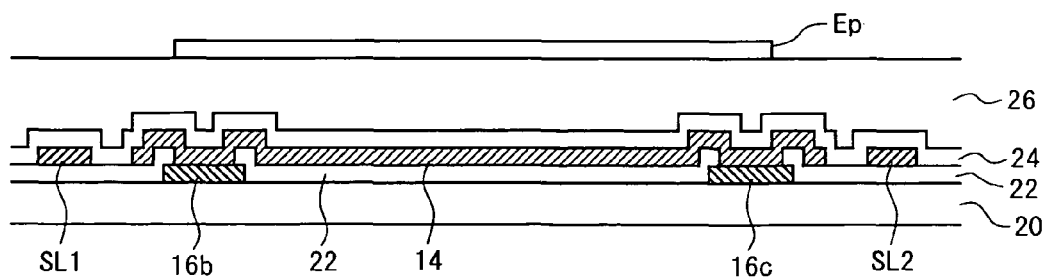
FIG. 3 is a sectional view taken along the line A-A in FIG. 2.

FIG. 2 is a plan view showing a second example of the pattern configuration of the active matrix substrate 110 according to the present embodiment and illustrates a pattern configuration of a part corresponding to two pixels. FIG. 3 is a cross-sectional view taken along the line A-A in FIG. 2. A constituent of this second example, which is the same as or corresponding to the constituent of the first example, is denoted by the same reference symbol and description of the same part will be omitted below.

In the second example, the storage capacitance line CsL, disposed so as to pass through the center of the pixel electrode Ep in parallel to the gate line GLj (j=1, 2, . . . , 2M), has four extended portions 16a to 16d extended along the outer edge of the pixel electrode Ep in parallel to the source line SLi in each of the pixel circuits. These extended portions 16a to 16d function as shield electrodes for suppressing influence of potential changes of the source lines SL1 and SL2 on the pixel electrode Ep. Among these four extended portions 16a to 16d, the extended portions 16b and 16c extended toward the discharge control signal line GshLj are connected with each other at the both ends by the source extraction electrode 14 via contact holes 15, and the source extraction electrode 14 is connected to the source electrode 12s of the discharge TFT 12.

More specifically, as shown in FIG. 3, the extended portions 16b and 16c of the storage capacitance line CsL and a gate insulating film 22 made of silicon nitride (SiNx) or the like are formed sequentially on a glass substrate 20 of a transparent insulating substrate, and the source extraction electrode 14 formed thereon is electrically connected to the extended portions 16b and 16c of the storage capacitance line CsL via the contact hole 15 provided in the gate insulating film 22. On this source extraction electrode 14, an interlayer insulating film 24 made of silicon nitride or the like for a passivation film and an interlayer insulating film 26 made of acryl photo-sensitive resin or the like are formed sequentially, and further the pixel electrode Ep made of ITO (Indium Tin Oxide) or the like is formed thereon as a transparent electrode.

Further in this second example, as shown in FIG. 2, the discharge control signal line GshLj is used also for the gate electrode (terminal) of the discharge TFT 12, and this discharge TFT 12 is covered with the discharge control signal line GshLj via an insulating film. Considering yield of producing the active matrix substrate, it is advantageous to use the first example in which the discharge TFT 12, the source extraction electrode, and drain extraction electrode thereof do not overlap with the discharge control signal line GshLj, but this second example has an advantage in the point of aperture ratio.

Figure 4:
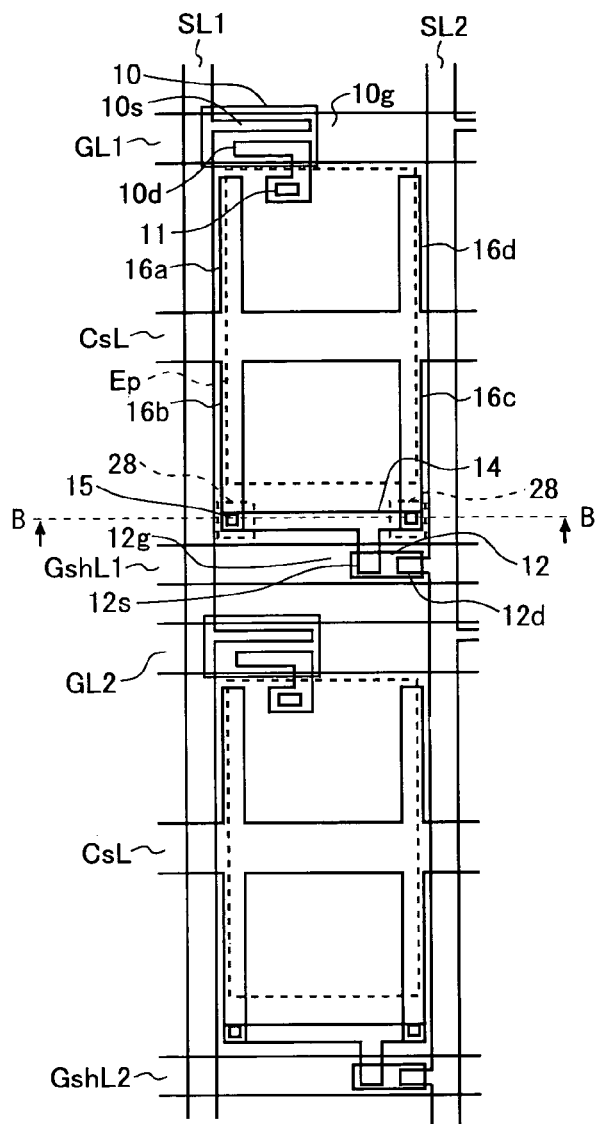
FIG. 4 is a plan view showing a third example of the pattern configuration for the active matrix substrate in the first embodiment.
Figure 5:
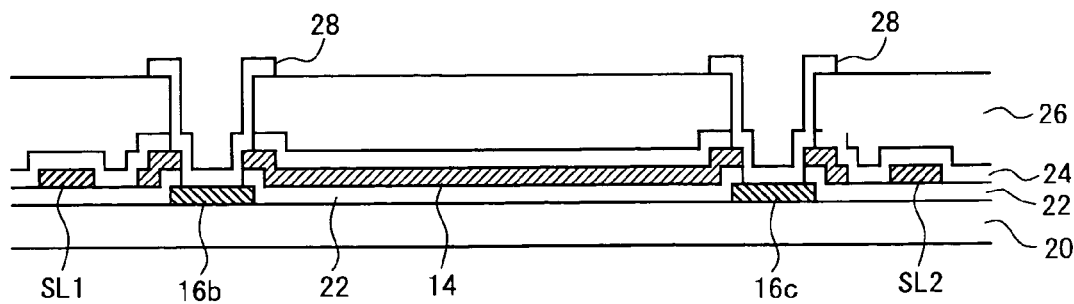
FIG. 5 is a sectional view taken along the line B-B in FIG. 4.

FIG. 4 is a plan view of a third example of the pattern configuration of the active matrix substrate 110 according to the present embodiment, and illustrates a pattern configuration of a part corresponding to two pixels. FIG. 5 is a cross-sectional view taken along the line B-B in FIG. 4. A constituent of this third example, which is the same as or corresponding to the constituent of the first or second example, is denoted by the same reference symbol and detailed description of the same part will be omitted below.

Also in this third example, the storage capacitance line CsL has four extended portions 16a to 16d in each pixel circuit as in the above second example. Then, among these extended portions 16a to 16d, the extended portions 16b and 16c extended toward the discharge control signal line CshLj are connected with each other at the both ends by the source extraction electrode 14 via the contact holes 15, and the source, extraction electrode 14 is connected to the source electrode 12s of the discharge TFT 12. Differently from the above second example, however, transparent conductive films 28 are formed so as to cover the contact holes 15 for connecting the ends of the extended portions 16b and 16c to the source extraction electrode 14, and this transparent conductive film 28 functions as a conductive electrode. Specifically, each of the above extended portions 16b and 16c is not connected directly to the source extraction electrode 14 in this contact hole 15 but connected to the source extraction electrode 14 via the transparent conductive film 28 (FIG. 5). The transparent conductive film 28 is formed by using the same mask as that of the pixel electrode Ep made of ITO (Indium Tin Oxide) or the like.

More specifically, as shown in FIG. 5, the extended portions 16b and 16c of the storage capacitance line CsL and the gate insulating film 22 made of silicon nitride (SiNx) or the like are formed sequentially on the glass substrate 20 of the transparent insulating substrate, and thereon, the source extraction electrode 14, the interlayer insulating film 24 made of silicon nitride or the like for the passivation film, and the interlayer insulating film 26 made of acryl photosensitive resin or the like are formed sequentially. Then, via the transparent conductive film 28 formed in the contact hole 15 provided in the interlayer insulating films 24 and 26 and the gate insulating film 22, the source extraction electrode 14 and the extended portions 16b and 16c of the storage capacitance line CsL are connected electrically with each other.

In addition to the advantage of the above second example, such a third example has an advantage over the second example in simplifying the production process, since the storage capacitance line CsL (extended portions 16b and 16c thereof) and the source extraction electrode 14 are connected electrically to each other via the transparent conductive film 28 which is formed at the same time as the pixel electrode Ep. Specifically, in a process for connecting electrically the drain electrode 10d of the pixel TFT 10 and the pixel electrode Ep with each other, it is possible to realize the electrical connection between the storage capacitance line CsL (extended portions 16b and 16c thereof) and the source extraction electrode 14 at the same time.

Figure 6:
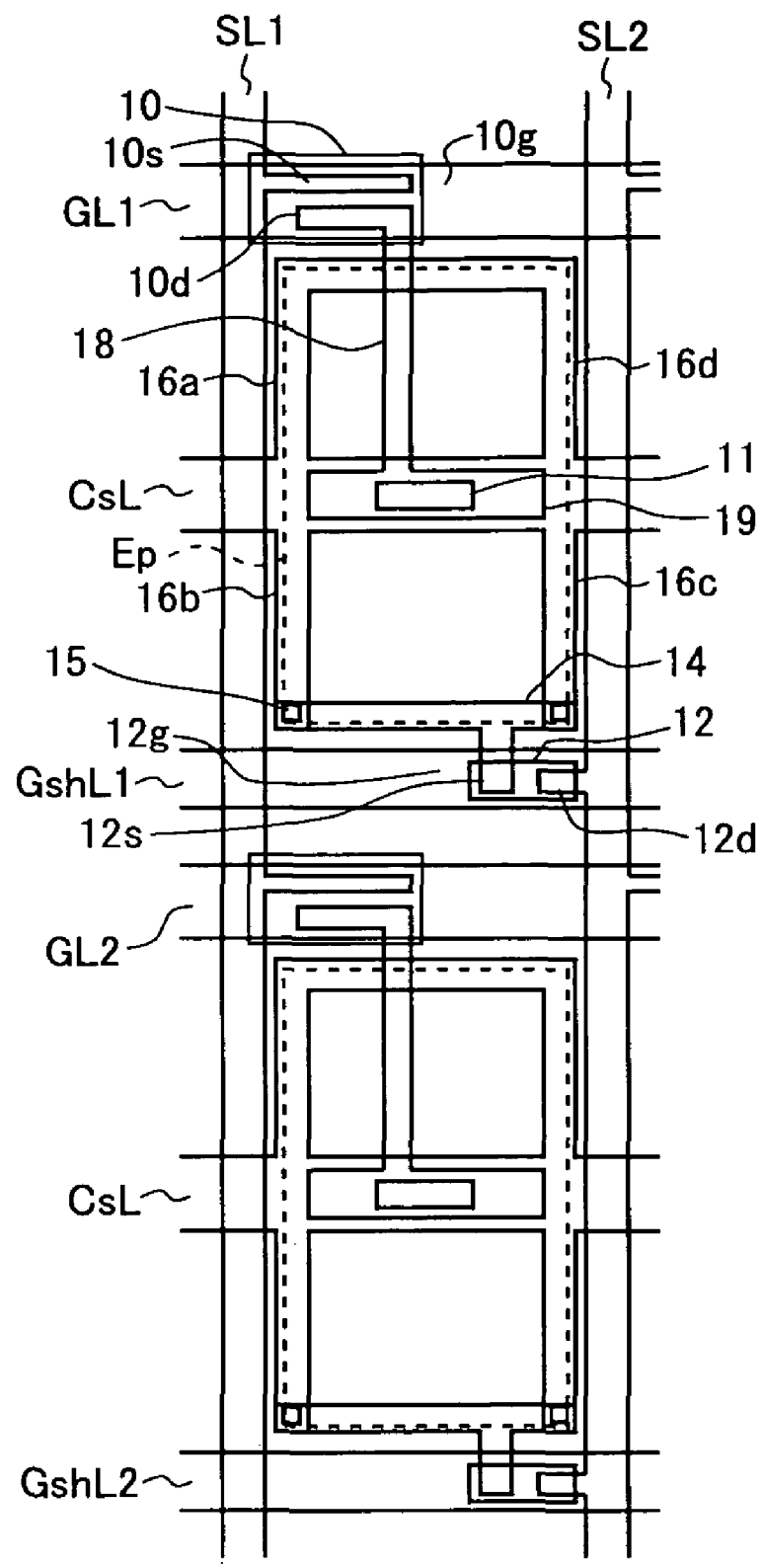
FIG. 6 is a plan view showing a fourth example of the pattern configuration for the active matrix substrate in the first embodiment.

FIG. 6 is a plan view showing a fourth example of the pattern configuration of the active matrix substrate 110 according to the present embodiment, and illustrates a pattern configuration of a part corresponding to two pixels. A constituent of this fourth example, which is the same as or corresponding to that of the first or second example, is denoted by the same reference symbol and detailed description of the same part will be omitted below.

In the fourth example, as in the above second example, the storage capacitance line CsL has four extended portions 16a to 16d extended along the outer edge of the pixel electrode Ep in parallel to the source line SLi in each pixel circuit in order to suppress the influence of the potential changes of the source lines SL1 and SL2 on the potential of the pixel electrode Ep. Among these extended portions 16a to 16d, the extended portions 16a and 16d extended toward the gate line GLj are connected with each other by an electrode 16e extended along the outer edge of the pixel electrode Ep in parallel to the gate line GLj (hereinafter, called "horizontal extended portion), and formed together with this horizontal extended portion 16e as a pattern combined with the storage capacitance line CsL. This horizontal extended portion 16e functions as a shield electrode for suppressing influence of the potential change of the gate line GLj on the potential of the pixel electrode Ep. Further, as in the second example, the extended portions 16b and 16c extended toward the discharge control signal line GshLj are connected with each other at the both ends by the source extraction electrode 14 via the contact holes 15 and the source extraction electrode 14 is connected to the source electrode 12s of the discharge TFT 12. In the fourth example, a ring shape structure is configured by the five extended portions 16a to 16e of the storage capacitance line CsL formed along the outer edge of the pixel electrode Ep and the source extraction electrode 14 in this manner.

Note that, since the storage capacitance line CsL has the horizontal extended portion 16e as described above, the drain electrode 10d of the pixel TFT 10 is connected to the pixel electrode Ep at the center of the pixel electrode Ep via a drain extraction electrode 18 and the contact hole 11. Further, the drain extraction electrode 18 has a portion 19 facing the storage capacitance line CsL at this connection part, and the storage capacitance Ccs is formed by a configuration in which this portion 19 faces the storage capacitance line CsL via the insulating film as a storage capacitance electrode.

Figure 7:
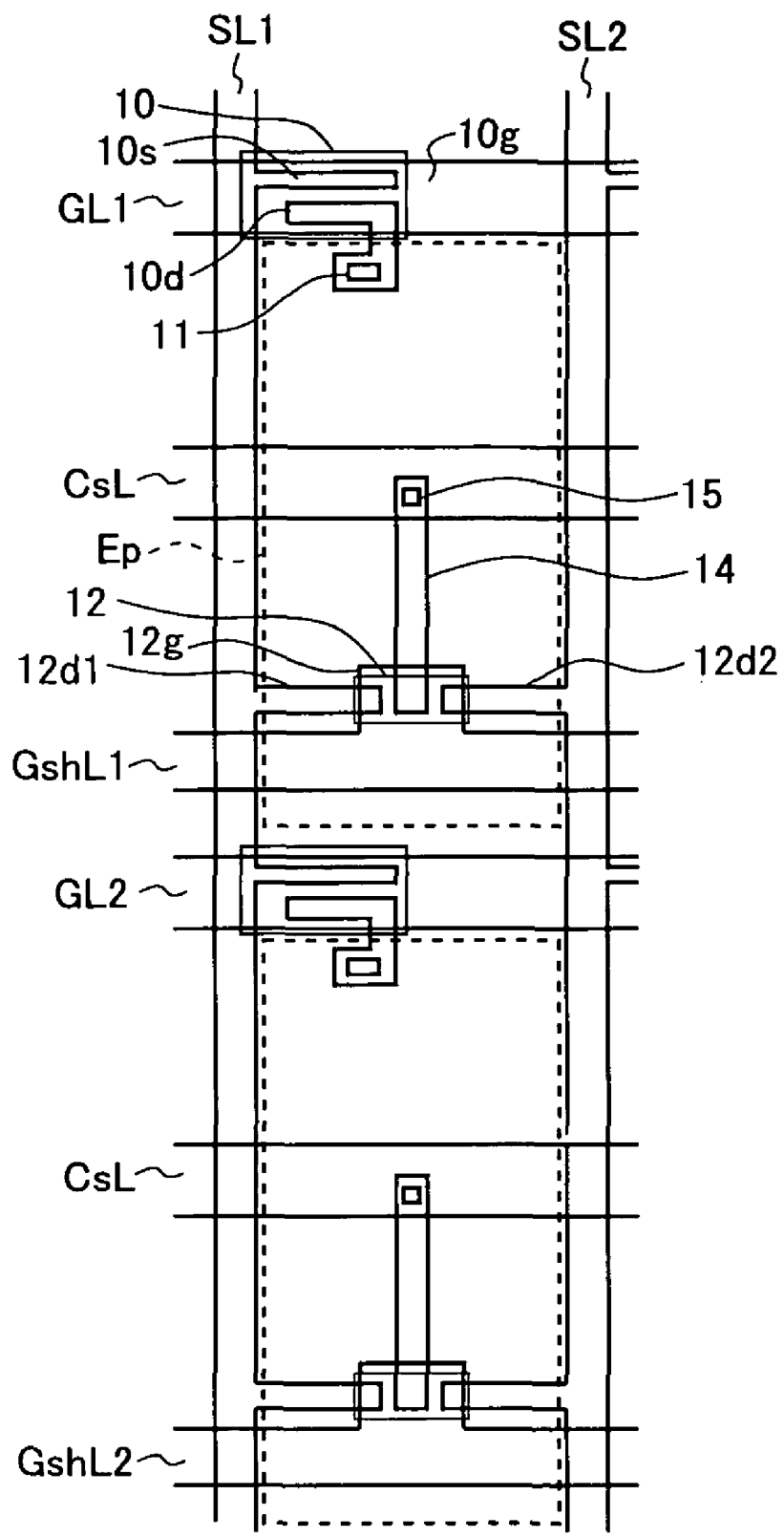
FIG. 7 is a plan view showing a fifth example of the pattern configuration for the active matrix substrate in the first embodiment.

FIG. 7 is a plan view showing a fifth example of the pattern configuration of the active matrix substrate 110 according to the present embodiment and illustrates a pattern configuration of a part corresponding to two pixels. A constituent of this fifth example, which is the same as or corresponding to the constituent of the first or second examples, is denoted by the same reference symbol and detailed description of the same part will be omitted below.

In the fifth example, the storage capacitance line CsL disposed in parallel to the gate line GLj so as to pass through the center of the pixel electrode Ep is connected electrically to the source extraction electrode 14 of the discharge TFT 12 via the contact hole 15. This discharge TFT 12 is provided in the neighborhood of the discharge control signal line GshLj and the gate electrode (terminal) 12g is connected to the discharge control signal line GshLj. Further, this discharge TFT 12 is provided with two drain electrodes, and one of the drain electrodes is connected to one source line SLi of the two source lines sandwiching this discharge TFT 12 via a first drain extraction electrode 12d1 and the other one of the drain electrodes is connected to the other source line SLi+1 of the two source lines via a second drain extraction electrode 12d2 (i=1, 2, . . . , N−1).

Meanwhile, in the fifth example, the pixel electrode Ep overlaps with the discharge control signal line GshLj and the discharge TFT 12. This pattern configuration enables the pixel portion to be made larger and is effective to improve the aperture ratio. Note that it is preferable to provide an interlayer insulating film with a thickness of several microns between the pixel electrode Ep and the discharge TFT 12, from the standpoint of reducing parasitic capacitance between each of the source lines (and the source extraction electrodes 12d1 and 12d2) connected to the discharge TFT 12 and the pixel electrode Ep. For this interlayer insulating film, for example, an organic film made of acrylate resin or SOG (Spin-on-Glass) material, or a laminated structure of the organic film and silicon nitride (SiNx) film or the like is used.

Figure 15:
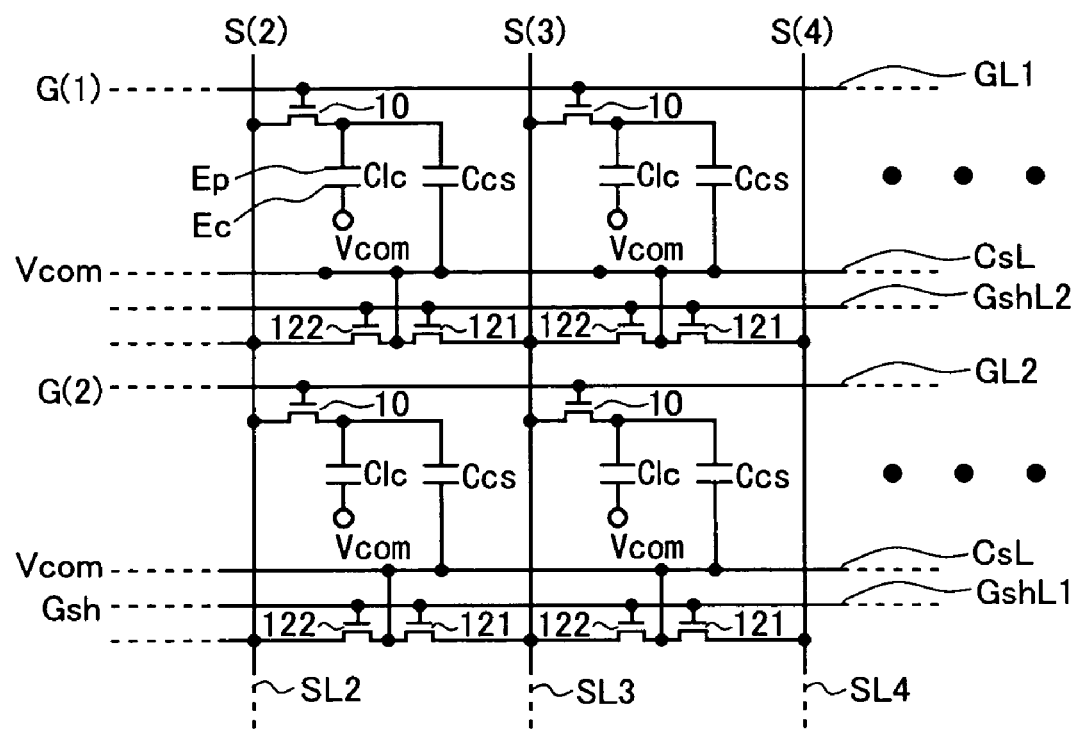
FIG. 15 is an equivalent circuit diagram showing a second example of the circuit configuration of the active matrix substrate in the first embodiment.

The equivalent circuit of the active matrix substrate 110 has a configuration as shown in FIG. 15 for this fifth example, while having a configuration as shown in FIG. 9 for each of the first to fourth examples described above. Specifically, in the fifth example, the neighboring two source lines SLi and SLi+1 (i=1, 2, ..., N−1) are connected with each other by a first TFT 121 and a second TFT 122 which correspond to the above discharge TFT 12 having the two drain electrodes, and each of the source lines SLi (i=1, 2, ..., N) is connected to the storage capacitance lines CsL via the first TFTs 121 as well as via the second TFTs 122. With such a configuration, the transfer of the accumulated charge of each of the source lines SL1 to SLN is accelerated for the discharge period Tsh and the potential Vs of each of the source lines SL1 to SLN reaches the common potential Vcom in a shorter time than in the first to fourth examples. Thereby, an advantage of the present embodiment, that is, the advantage that the degradation of display quality caused by the difference in the charge amount or the shortage of charging in the pixel capacitance can be suppressed even when a larger size or a higher resolution is employed in the liquid crystal display device and the drive frequency thereof is increased, can be further increased.

<1.4 Other Configuration Examples of the Source Driver>

In the configuration shown in FIG. 11, the output part 304 of the source driver 300 includes a switch circuit composed of switching elements of the N first MOS transistors SWa, the (N−1) second transistors SWb, and the third MOS transistor, and the inverter 33, and this switch circuit realizes the charge sharing operation and the operation to short-circuit the source lines SL1 to SLN to the common potential Vcom. However, the configuration of the output part 304 of the source driver 300 is not limited to the configuration shown in FIG. 11 (hereinafter, called "first configuration example"), and may be a configuration shown in FIG. 16 or a configuration shown in FIG. 17, for example.

Figure 16:
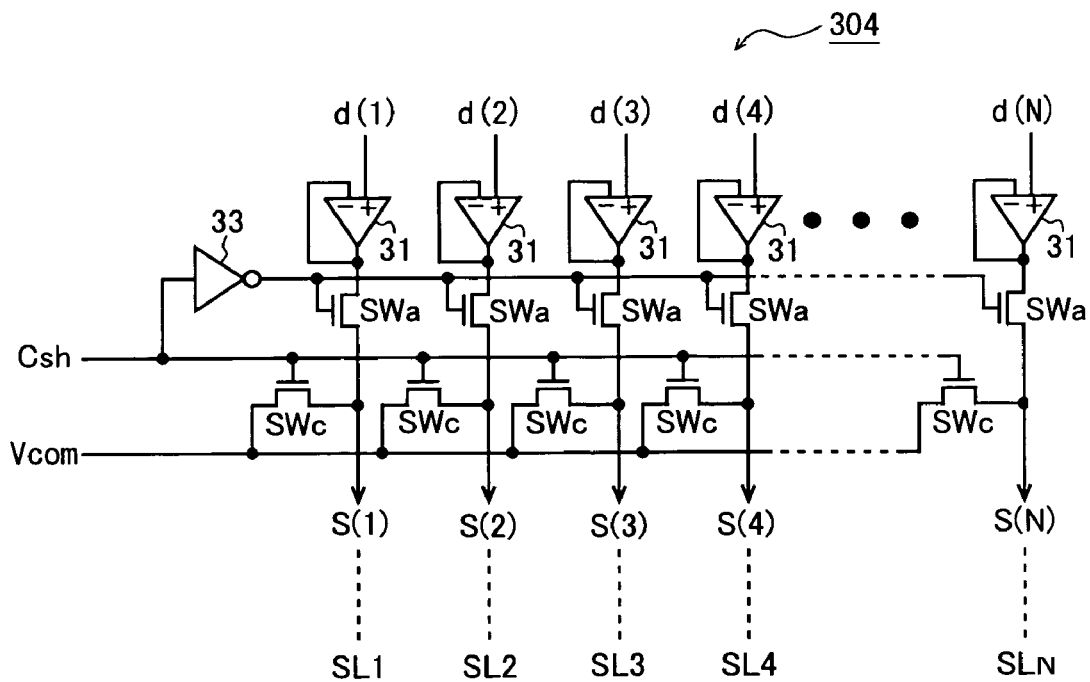
FIG. 16 is a circuit diagram showing a second configuration example of the output part of the above source driver.

FIG. 16 is a circuit diagram showing the second configuration example of the output part 304 in the source driver 300. A constituent of the output part 304 in this configuration example, which is the same as that of the first configuration example, is denoted by the same reference symbol and description thereof will be omitted.

The output part 304, in the present configuration example, is also provided with a second MOS transistor SWc serving as a switching element one by one for each of the source lines SLi (i=1 to N) as in the first configuration example. However, while the switch circuit is configured in the first configuration example such that the second MOS transistor SWb is inserted one by one between the neighboring source lines, the switch circuit is configured in the present configuration example such that the second MOS transistor SWc is inserted one by one between each of the source lines SLi and an input terminal of the source driver 300 for receiving the common voltage Vcom from outside (hereinafter, called "common voltage input terminal"). Specifically, in the present configuration example, the output terminal of the source driver to be connected to each of the source lines SLi is connected to the common voltage input terminal via any one of these second MOS transistors SWc. Then, the discharge control signal Csh is provided to each of the gate terminals of these second MOS transistors SWc.

Also in the second configuration example as described above, as in the first configuration example, based on discharge control signal Csh, the analog voltage signals d(1) to d(N) generated in the data signal generation part 302 are outputted as the data signals S(1) to S(N) via the buffers 31 and applied to the source lines SL1 to SLN for the period except for the discharge period Tsh (for the effective scanning period), respectively, and the application of the data signals S(1) to S(N) to the source lines SL1 to SLN is cut off and also all the source lines SL1 to SLN are applied with the common potential Vcom for the discharge period Tsh. Additionally, with this second configuration example, the common potential Vcom is applied to each of the source lines SLi (i=1 to N) via only the one MOS transistor SWc for the discharge period Tsh.

Figure 17:
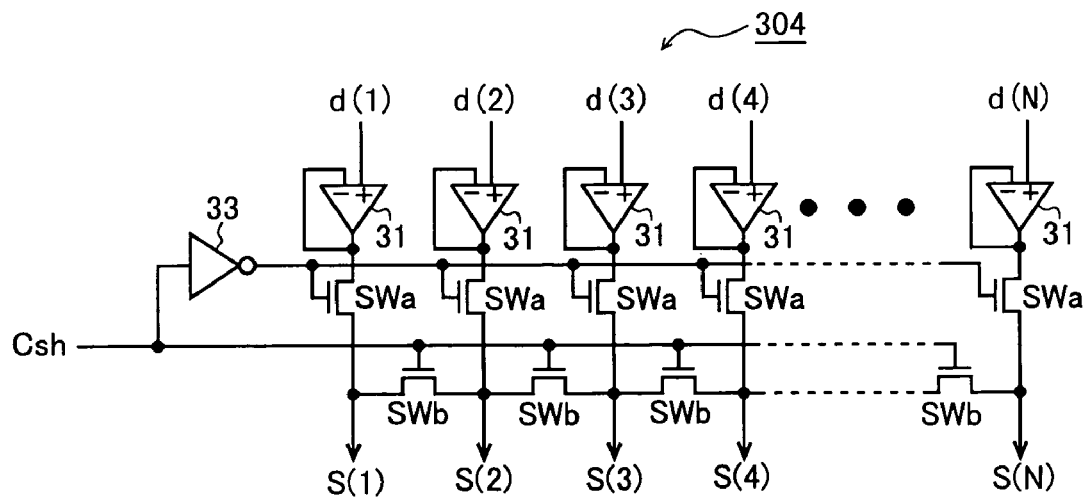
FIG. 17 is a circuit diagram showing a third configuration example of the output part of the above source driver.

FIG. 17 is a circuit diagram showing a third configuration example of the output part 304 of the source driver 300. This third configuration example, corresponding to a typical configuration of the charge sharing method, is the same as the first configuration example (FIG. 11) except for that the third MOS transistor SW2 serving as a switching element is removed and the common potential Vcom is not applied. A constituent of the output part 304 in this configuration example, which is the same as or corresponding to the constituent of the first configuration example, is denoted by the same reference symbol and description thereof will be omitted.

According to this configuration, although the source lines SL1 to SLN are not applied with the common potential Vcom from the source driver 300 for the discharge period Tsh, each of the source lines SL1 to SLN is applied with the common potential Vcom in the active matrix substrate 110 for the discharge period Tsh (refer to FIG. 9 or the like). Accordingly, also this third configuration example enables the potential of each of the source lines SL1 to SLN to reach the common potential Vcom in a shorter time than in the conventional configuration.

2. Second Embodiment

The present invention can be applied to a liquid crystal display device employing a drive method in which a upper half part and a lower half part of a display part 100 are driven by different drive circuits (hereinafter, called "upper-and-lower division drive method"). A second embodiment will be described below for such a liquid crystal display device using an active matrix substrate according to the present invention.

Figure 18:
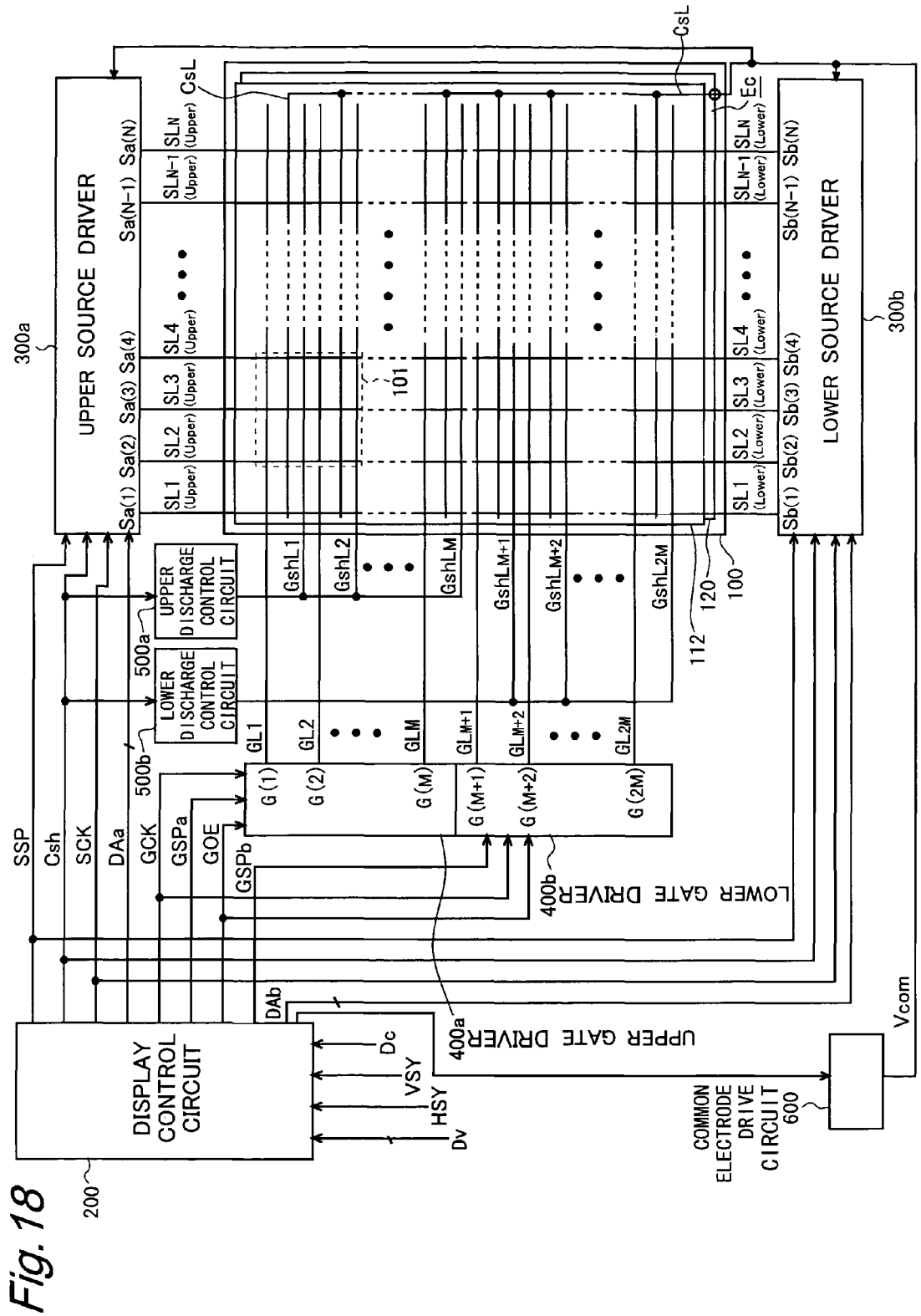
FIG. 18 is a block diagram showing a configuration of a liquid crystal display device according to a second embodiment of the present invention.

FIG. 18 is a block diagram showing a configuration of a liquid crystal display device according to the present embodiment. In a active matrix substrate 112 of this liquid crystal display device, each source line is composed of a upper source line SLi(upper) and a lower source line SLi(lower) which are electrically separated from: each other at center. The other constituents of the active matrix substrate 112 are the same as those of the active matrix substrate 110 in the first embodiment. Accordingly, a pixel circuit configuration of the active matrix substrate 112 is also the same as that of the pixel circuit of the active matrix substrate 110 in the first embodiment and an equivalent circuit of a part 101 corresponding to neighboring four pixels is as shown in FIG. 9.

Corresponding to the configuration which separates each of the source lines of the active matrix substrate 112 into the upper and lower, a source driver is composed of a upper source driver 300a for driving the upper source lines SL1 (upper) to SLN(upper) and a lower source driver 300b for driving the lower source lines SL1(lower) to SLN(lower). Further, a gate driver is composed of a upper gate driver 400a for driving the M gate lines GL1 to GLM which intersect the upper source lines SL1(upper) to SLN(upper) and a lower gate driver 400b for driving the M gate lines GLM+1 to GL2M which intersect the lower source lines SL1(lower) to SLN(lower). Then, a discharge control circuit is composed of a upper discharge control circuit 500a for applying the discharge control signal Gsh for the matrix substrate to the M discharge control signal lines GshL1 to GshLM which intersect the upper source lines SL1(upper) to SLN(upper) and a lower discharge control circuit 500b for applying the discharge control signal Csh for the matrix substrate to the M discharge control signal lines GshLM+1 to GshL2M which intersect the lower source lines SL1(lower) to SLN(lower).

Further, a display control circuit 200 generates a upper digital image signal DAa to be supplied to the upper source driver 300a and a lower digital image signal DAb to be supplied to the lower source driver 300b, as the digital image signal to be supplied to the source driver, and generates a upper gate start pulse signal GSPa to be supplied to the upper gate driver 400a and a lower gate start pulse signal GSPb to be supplied to the lower gate driver 400b, as the gate start pulse signal to be supplied to the gate driver. The upper source driver 300a generates data signals Sa(1) to Sa(N) to be applied to the upper source lines SL1(upper) to SLN(upper), respectively, using the upper digital image signal DAa, and the lower source driver 300b generates data signals Sb(1) to Sb(N) to be applied to the lower source lines SL1(lower) to SLN(lower), respectively, using the lower digital image signal DAb. The upper gate driver 400a generates scanning signals G(1) to G(M) to be applied to the gate lines GL1 to GLM, respectively, using the upper gate start pulse GSPa, and the lower gate driver 400b generates scanning signals G(M+1) to G(2M) to be applied to the gate lines GLM+1 to GL2M, respectively, using the lower gate start pulse GSPb. The configuration of this liquid crystal display device other than that described above is the same as in the first embodiment, and the same part is denoted by the same symbol and description thereof will be omitted.

Also in the liquid crystal display device having the configuration as described above, in addition to the charge sharing operation in the upper and lower source drivers 300a and 300b for the discharge period Tsh (and the operation to short-circuit to the common potential Vcom), each of the source lines SL1 to SLN is short-circuited to the neighboring storage capacitance line CsL in the active matrix substrate 112 by the discharge TFT 12 connected to each of the discharge control signal lines GshLj and thereby it is possible to obtain the same effect as that in the first embodiment.

3. Third Embodiment

Next, a third embodiment of the present invention will be described for an example of a liquid crystal display device according to the present invention employing a method realizing an impulse type display of an image by inserting a black display period (black insertion). An entire configuration of the liquid crystal display device according to the present embodiment is the same as that of the liquid crystal display device according to the first embodiment as shown in FIG. 8, and the same or corresponding part is denoted by the same reference symbol and detailed description thereof will be omitted. In the present embodiment, an internal configuration of a gate driver is different from that of a typical gate driver such as the gate driver 400 in the first embodiment. Accordingly, the present embodiment will be described focused on the gate driver.

Figure 20:
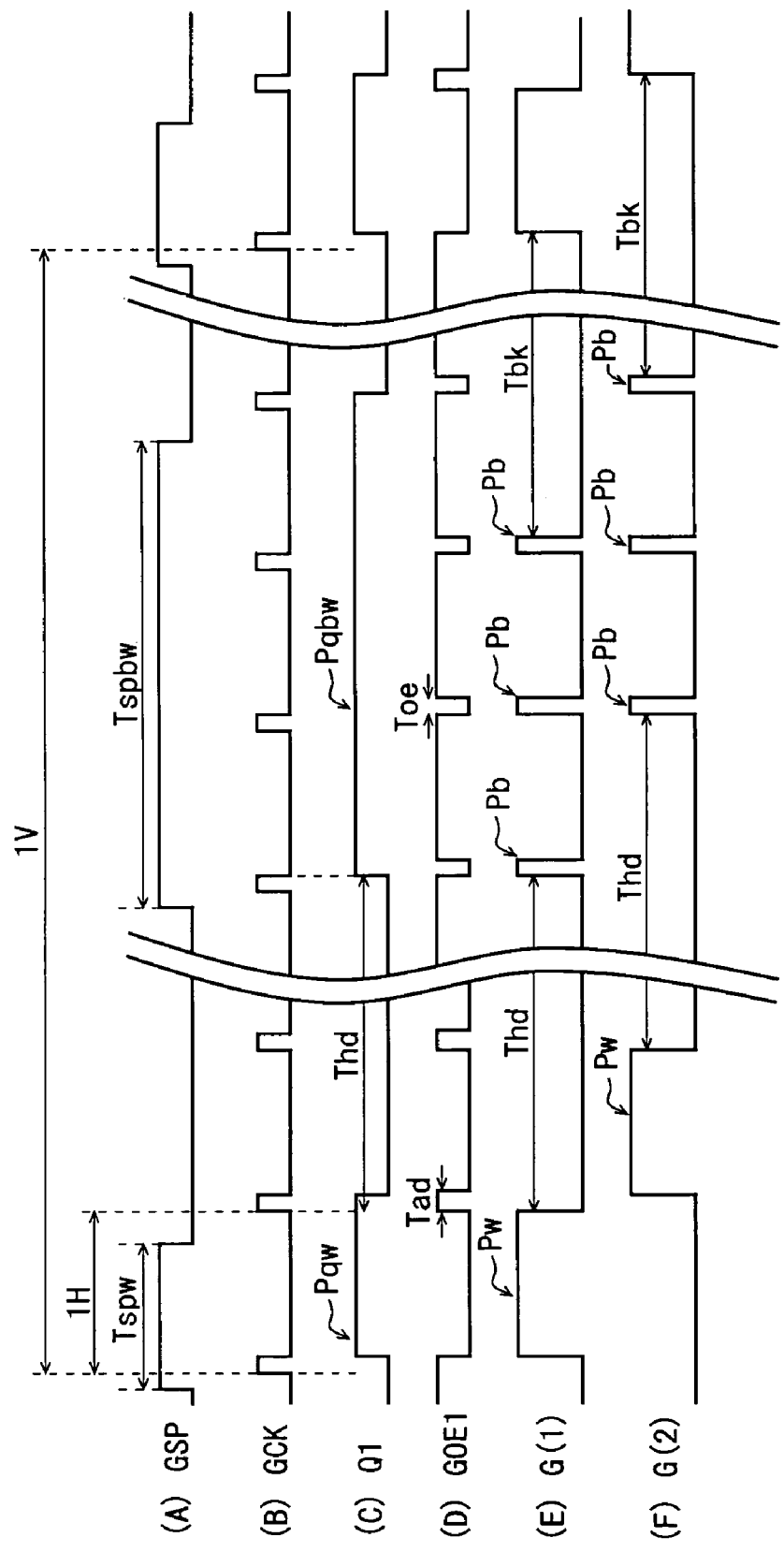
FIG. 20 consists of signal waveform charts (A) to (F) for explaining the operation of the gate driver in the third embodiment.

The gate driver in the present embodiment selects sequentially the gate lines GL1 to GLM for approximately one horizontal period (effective scanning period) per gate line in each frame period of the digital image signal GA in order to write the data signals S(1) to S(N) into the respective pixel formation portions (pixel capacitance Cp thereof) based on a gate start pulse GSP, gate clock signal GCK and gate driver output control signal GOEr (r=1, 2, . . . , q), and also, for the black insertion to be described below, selects the gate line GLj (j=1 to 2M) for a predetermined period (period corresponding to a black voltage application pulse Pb shown in FIG. 20 to be described below) within the discharge period Tsh selected preliminarily for each of the scanning signal lines GLj among the discharge periods Tsh in which the discharge control signal Csh from the display control circuit 200 exhibits the H level in each of the horizontal periods.

Figure 19:
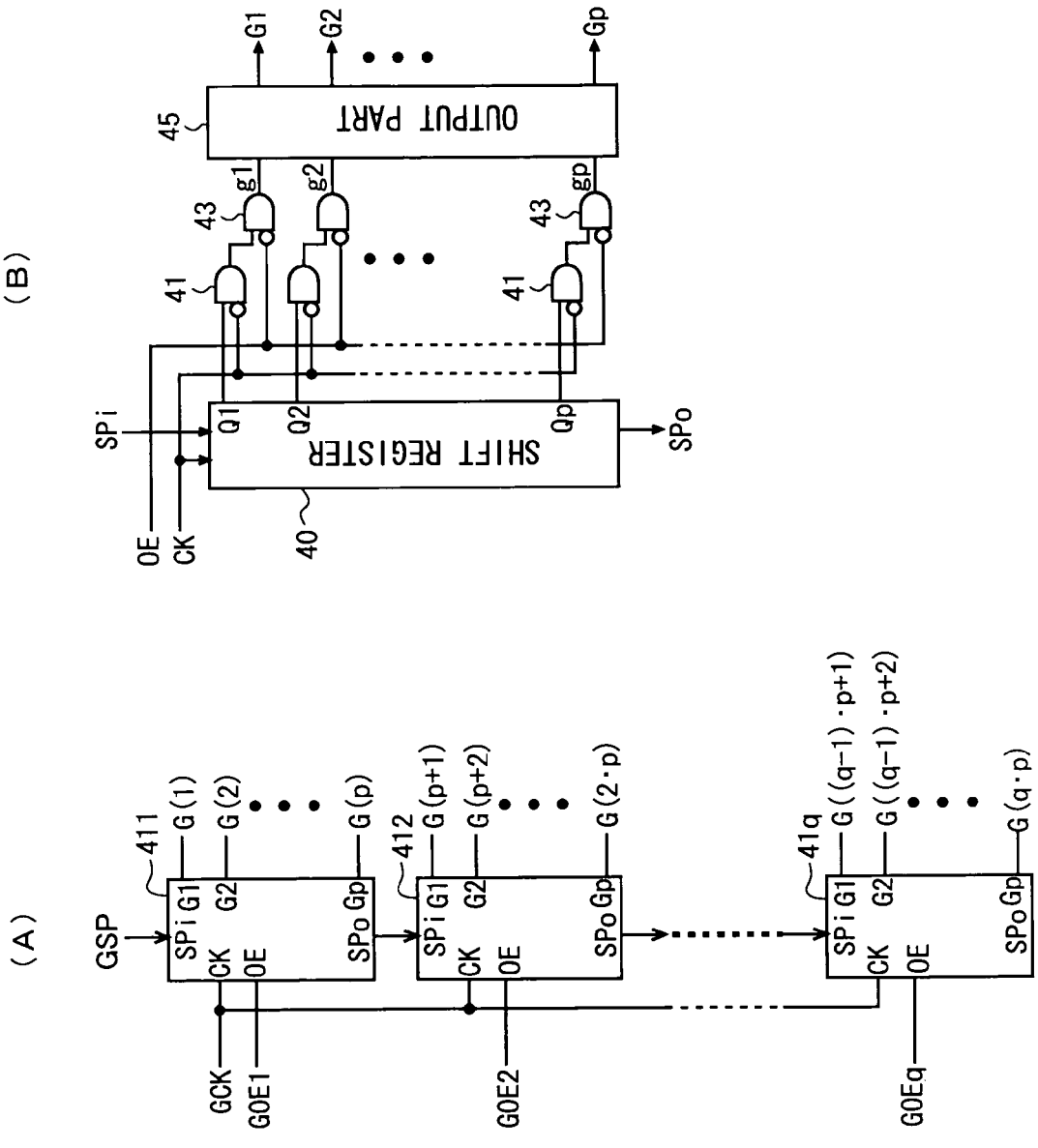
FIG. 19 consists of block diagrams (A) and (B) showing a configuration example for a gate driver in a third embodiment of the present invention.

(A) and (B) of FIG. 19 are block diagrams showing a configuration example of the gate driver 400. The gate driver 400 of this configuration example is composed of gate driver IC (Integrated Circuit) chips 411, 412, . . . , 41q which are a plurality of (q) partial circuits including shift registers.

Each of the gate driver IC chips includes, as shown in (B) of FIG. 19, a shift register 40, first and second, AND gates 41 and 43 provided corresponding to each stage of the shift register 40, and an output part 45 for outputting the scanning signals G1 to Gp based on the output signals g1 to gp of the second AND gates 43, and receives a start pulse signal SPi, a clock signal CK, and an output control signal OE from outside. The start pulse SPi is provided to the input end of the shift register 40 and the shift register 40 outputs via output end thereof a start pulse signal SPo to be inputted into the following gate driver IC chip. Further, a logically inverted signal of the clock signal CK is inputted into each of the first AND gates 41 and a logically inverted signal of the output control signal OE is inputted into each of the second AND gates 43. Then, an output signal Qk (k=1 to p) from each stage of the shift register 40 is inputted into the first AND gate 41 corresponding to the stage, and an output signal of the first AND gate 41 is inputted into the second AND gate 43 corresponding to the stage.

The gate driver in the present configuration example is implemented by a cascade connection of the plurality (q) of gate driver IC chips 411 to 41q having the above configuration as shown in (A) of FIG. 19. Specifically, the output end of the shift register in each of the gate driver IC chips (output terminal of the start pulse signal SPo) is connected to the input end of the shift register in the next gate driver IC chip (input terminal of the start pulse signal SPi) such that the shift registers 40 in the gate driver IC chips 411 to 41q form one shift register (hereinafter, the shift register formed by the cascade connection in this manner is called "combined shift register"). Note that, to the input end of the shift register in the top gate driver IC chip 411, the gate start pulse signal GSP is inputted from the display control circuit 200, and the output end of the shift register in the last gate driver IC chip 41q is not connected to outside. Further, the gate clock signal GCK from the display control circuit 200 is inputted commonly into each of the gate driver IC chips 411 to 41q as the clock signal CK. Meanwhile, the gate driver output control signal GOE generated in the display control circuit 200 is composed of the 1st to qth gate driver output control signals GOE1 to GOEq, and these gate driver output control signals GOE1 to GOEq are inputted individually into the gate driver IC chips 411 to 41q as the output control signals OE, respectively.

Next, the operation of the gate driver in the above configuration example will be described with reference to FIG. 20. The display control circuit 200, as shown in (A) of FIG. 20, generates as the gate start pulse signal GSP a signal which exhibits the H level (active) for a period Tspw corresponding to the pixel data write pulse Pw and a period Tspbw corresponding to three black voltage application pulses, and also generates the gate clock signal GCK which exhibits the H level for a predetermined period for every one horizontal period (1H) as shown in (B) of FIG. 20. When such gate start pulse signal GSP and gate clock signal GCK are inputted into the gate driver shown in (A) of FIG. 19, the output signal Q1 of the first stage of the shift register 40 in the top gate driver IC chip 411 is outputted as a signal as shown in (C) of FIG. 20. The output signal Q1 includes one pulse Pqw corresponding to the pixel data write pulse Pw and one pulse Pqbw corresponding to the three black voltage application pulses Pb in each frame period and these two pulses Pqw and Pqbw are spaced apart by a predetermined period. Such two pulses Pqw and, Pqbw are transferred sequentially in the combined shift register in the gate driver according to the gate clock signal GCK. According to the transfer, a signal having a waveform as shown in (C) of FIG. 20 is outputted from each stage of the combined shift register sequentially shifted by one horizontal period (1H).

Further, the display control circuit 200 generates the gate driver output control signals GOE1 to GOEq to be respectively applied to the gate driver IC chips 411 to 41q which compose the gate driver, as described above. Here, the gate driver output control signal GOEr to be provided to the rth gate driver IC chip 41r exhibits the L level for a period in which the pulse Pqw corresponding to the pixel data write pulse Pw is outputted from any one of the stages of the shift register 40 in the gate driver IC chip 41r except for exhibiting the H level for a predetermined period Tad near the gate clock signal GCK pulse for adjusting the pixel data write pulse Pw, and exhibits the H level for the other period except for exhibiting the L level for a predetermined period Toe immediately after the gate clock signal GCK exhibits a change from the H level to the L level. Note that the predetermined period Toe is set so as to be included in any one of the discharge periods Tsh. For example, the gate driver output control signal GOE1 as shown in (D) of FIG. 20 is provided to the top gate driver IC chip 411. Note that a pulse (this pulse corresponds to the H level exhibited by the output control signal GOEr for the above predetermined period Tad and is called "write period adjustment pulse", hereinafter) included in the gate driver output control signals GOE1 to GOEq for adjusting the pixel data write pulse Pw, rises earlier than the rise of the gate clock signal GCK or falls later than the fall of the gate clock signal GCK according to the required pixel data write pulse Pw. Further, the pixel data write pulse PW may be adjusted by using only the gate clock signal GCK without using such a write period adjustment pulse.

In each of the gate driver IC chips 41r (r=1 to q), internal scanning signals g1 to gp are generated by the first and second AND gates 41 and 43, based on the output signal Qk (k=1 to p) of each stage in the shift register 40 as described above, the gate clock signal GCK, and the gate driver output control signal GOEr, and these internal scanning signals g1 to gp are level-converted in the output part 45 and outputted as the scanning signals G1 to Gp to be applied to the gate lines. Thereby, as shown in (E) and (F) of FIG. 20, the pixel data write pulse Pw is applied sequentially to the gate lines GL1 to GLM, and also, to each of the gate lines GLj (j=1 to 2M), the black voltage application pulse Pb is applied when a predetermined time Thd has elapsed since the end point of the pixel data write pulse Pw application (fall point) and then the two black voltage application pulses Pb are applied at an interval of one horizontal period (1H). After the three black voltage application pulses Pb are applied in this manner, the L level is held until the pixel data write pulse Pw is applied in the next frame period.

Next, with reference to FIG. 21, the drive of the display part 100 (FIG. 8 and FIG. 9) by the above source driver 300 and gate driver 400 in the present embodiment will be described. In each of the pixel formation portions of the display part 100, by the application of the pixel data write pulse Pw to the gate line GLj connected to the gate terminal of TFT 10 included therein the TFT 10 is turned on and the voltage of the source line SLi connected to the source terminal of the TFT 10 is written into the pixel formation portion as the value of the data signal S(i). Specifically, the voltage of the source line SLi is held in the pixel capacitance Cp. After that, the gate line GLj is in the unselected state for the period Thd until the black voltage application pulse Pb appears and thereby the voltage written into the pixel formation portion is held as it is.

The black voltage application pulse Pb is applied to the gate line GLj in the discharge period Tsh after the period of the unselected state (hereinafter, called "pixel data holding period) Thd. As described above, in the discharge period Tsh, the value of each of the data signals S(i), that is, the voltage of each of the source lines SLi becomes approximately equal to the DC level of the data signal, S(i) (i.e., black voltage). Therefore, the voltage held in the pixel capacitance Cp of the pixel formation portion changes toward a voltage corresponding to the black display (black voltage) when the black voltage application pulse Pb is applied to the gate line GLj. However, the width of the black voltage application pulse Pb is short, and therefore the three black voltage application pulses Pb are applied sequentially to the gate line GLj at an interval of one horizontal scanning period (1H) in each frame period as shown in (D) and (E) of FIG. 21, in order to cause the voltage held in the pixel capacitance Cp to be the black voltage securely. Thereby, the luminance of the pixel formed by the pixel formation portion connected to the gate line GLj (transmitted light amount determined by the voltage held in the pixel capacitance) L(j, i) changes as shown in (H) of FIG. 21.

Accordingly, in one display line corresponding to the pixel formation portions connected to each of the gate lines GLj, display is performed according to the digital image signal DA during the pixel data holding period Thd and then the black display is performed during a period Tbk from the time when the above three black voltage application pulses Pb are applied to the time when the pixel data write pulse Pw is next applied to the gate line GLj. In this manner, the period when the black display is performed (hereinafter, called "black display period") Tbk is inserted into each frame period and thereby the impulse type display is realized in the liquid crystal display device.

Figure 21:
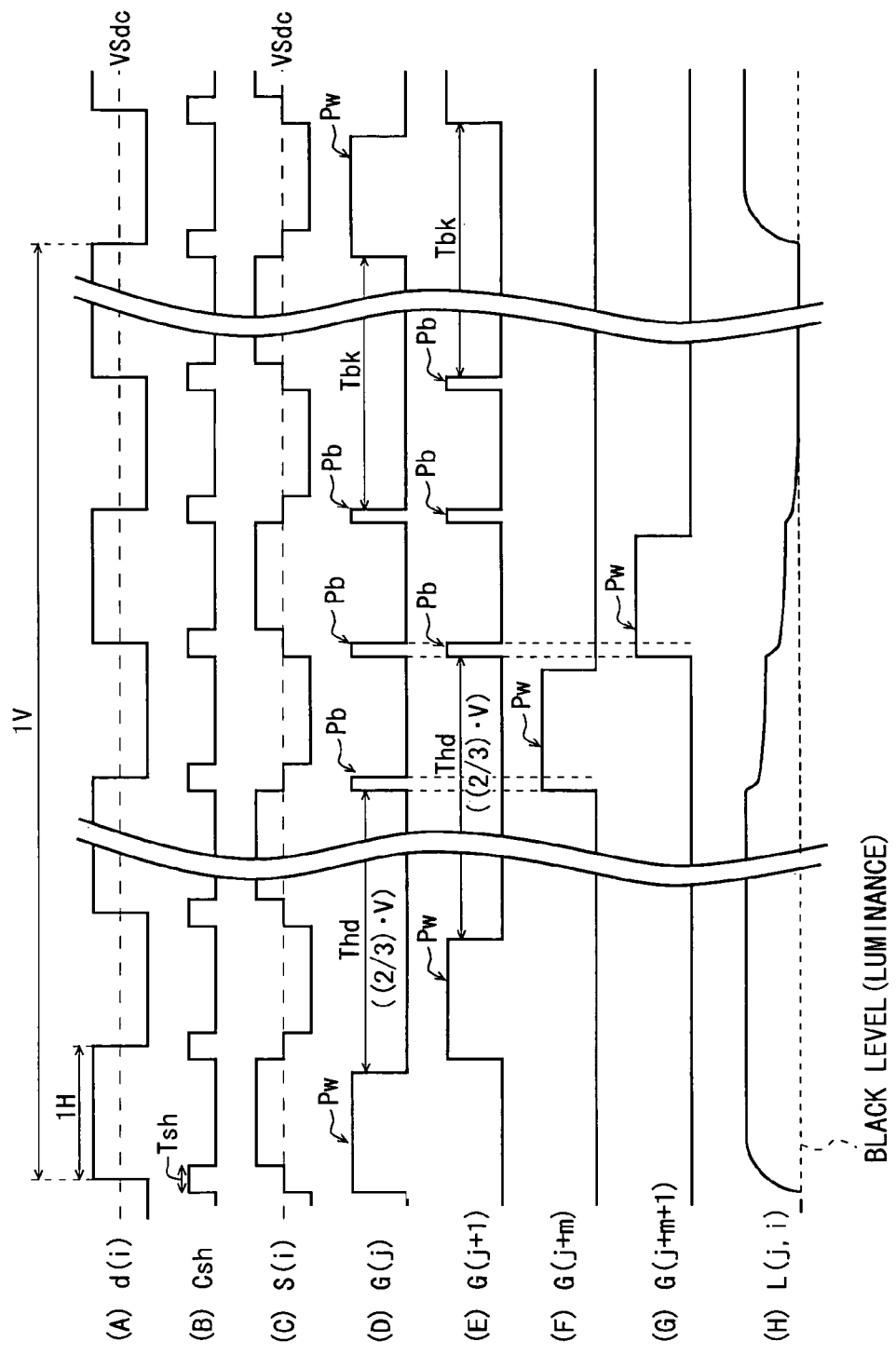
FIG. 21 consists of signal waveform charts (A) to (H) for explaining a drive method of a liquid crystal display device according to the third embodiment.

As apparent from (D) and (E) of FIG. 21, since the timing when the pixel data write pulse Pw appears shifts by one horizontal scanning period (1H) every one of the scanning signals G(j), timing when the black voltage application pulse Pb appears also shifts by one horizontal scanning period (1H) every one of the scanning signals G(j) . . . . Therefore, the black display period Tbk also shifts by one horizontal scanning period (1H) every one display line and the black insertion having the same length is performed for all the display lines. In this manner, a sufficient black insertion period is secured without making the charging period shorter in the pixel capacitance Cp for writing the pixel data. Further, it is not necessary to increase the operation speed of the source driver 300 or the like for the black insertion.

In the third embodiment described so far, as shown in (D) to (G) of FIG. 21, the pixel data write pulse Pw and the black voltage application pulse Pb overlap with each other temporally. For example, the pixel data write pulse Pw of the scanning signal G(j+m) overlaps temporally with the black voltage application pulse Pb of the scanning signal G(j), and the pixel data write pulse Pw of the scanning signal G(j+m+1) overlaps temporally with the black voltage application pulse Pb of the scanning signal G(j) and G(J+1). Here, when the number of the black voltage application pulses Pb included in each of the scanning signal G(j) (j=1, 2, ..., 2M) within one frame period (hereinafter, called "number of the black voltage application pulses per one frame") is increased, the number of the black voltage application pulses Pb overlapping temporally with the pixel data write pulses Pw also increases. Since the number of the gate lines which exhibit the H level at the same time increases thereby among the gate lines GL1 to GL2M on the active matrix substrate 100, the load of the power supply for providing the H level increases and the waveforms of the pixel data write pulse Pw and the black voltage application pulse Pb are deteriorated. The temporal width of the black voltage application pulse Pb is extremely shorter than that of the pixel data write pulse Pw, and therefore this waveform deterioration affects mainly the black voltage application pulse Pb. As apparent from (H) of FIG. 21, when the number of the black voltage application pulses Pb per one frame is increased from one, the pixel luminance in the black display period Tbk becomes to have a more sufficient black level, but, the effect of the waveform deterioration to the black voltage application pulse also increases. Therefore, the pixel luminance in the black display period Tbk can not be made to have a sufficient black level when the number of the black voltage application pulses per one frame is increased more than a certain number. Further, recently in the display device using the active matrix substrate, there is required the resolution improvement or a technique for improving moving image visibility such as one to write pixel data of an interpolated image into the pixel formation portion by increasing the frame frequency, and in this situation, there is a concern that the waveform deterioration of the pixel data write pulse Pw, caused by the temporal overlapping of the pixel data write pulse Pw and the black voltage application pulse Pb, leads to a shortage of pixel data writing (shortage of charging the pixel capacitance).

Figure 22:
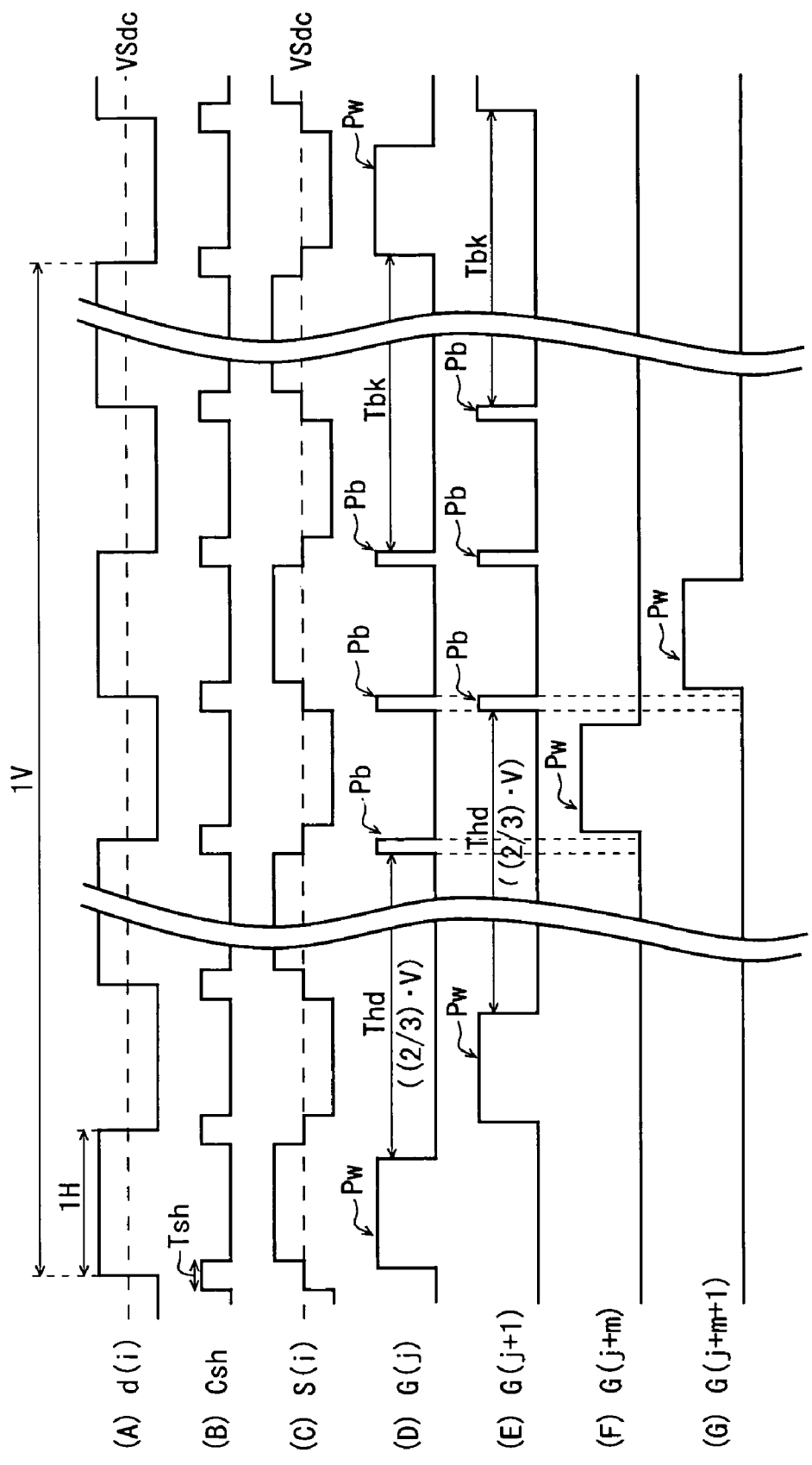
FIG. 22 consists of signal waveform charts (A) to (G) for explaining a scanning signal of a liquid crystal display device according to a variation of the third embodiment.

Accordingly, it is preferable to have a configuration in which the scanning signals G(1) to G(2M) are applied to the respective gate lines GL1 to GL2M on the active matrix substrate 100 such that the pixel data write pulse Pw and the black voltage application pulse Pb do not overlap with each other temporally, as shown in FIG. 22. Differently from the third embodiment (refer to FIG. 21), in the example shown in FIG. 22, the pixel data write pulse Pw in each of the scanning signals G(k) (k=1 to 2M) does not overlap temporally with the black voltage application pulse in any of the scanning signals ((D) to (G) of FIG. 22). By the gate driver being configured to output such scanning signals G(1) to G(2M), the number of the gate lines which exhibit the H level at the same time (the number of the scanning signals which exhibit the H level at the same time) is decreased. As a result, it is possible to suppress the shortage of charging in the pixel capacitance caused by the waveform deterioration of the pixel data write pulse Pw, while causing the pixel luminance to have a sufficient black level in the black display period Tbk.

4. Variations

In the first embodiment, as the charge sharing switching element, the MOS transistor. SWb is provided in the output part 304 of the source driver (FIG. 11) and also the discharge TFT 12 is provided on the active matrix substrate 110 (FIG. 8 and FIG. 9). However, the charge sharing switching element (MOS transistor SWb) may be omitted in the output part 304 of the source driver as far as the potential of the source line SLi can be made to reach the value equal to the common potential Vcom within the discharge period Tsh.

Further, in the active matrix substrate in the first and second embodiments, the discharge control signal line GshLj is disposed along each of the gate lines GLj (j=1, 2, ..., 2M), and the discharge TFT 12 is provided for each of the source lines SLi (i=1, 2, ..., N) in numbers equal to the number of the gate lines (2M) (FIG. 8 and FIG. 9). However, the present invention is not limited to such a configuration, and any configuration may be used as far as the potential of each of the source lines can be made to reach the value equal to the common potential Vcom within the discharge period Tsh.

Figure 23:
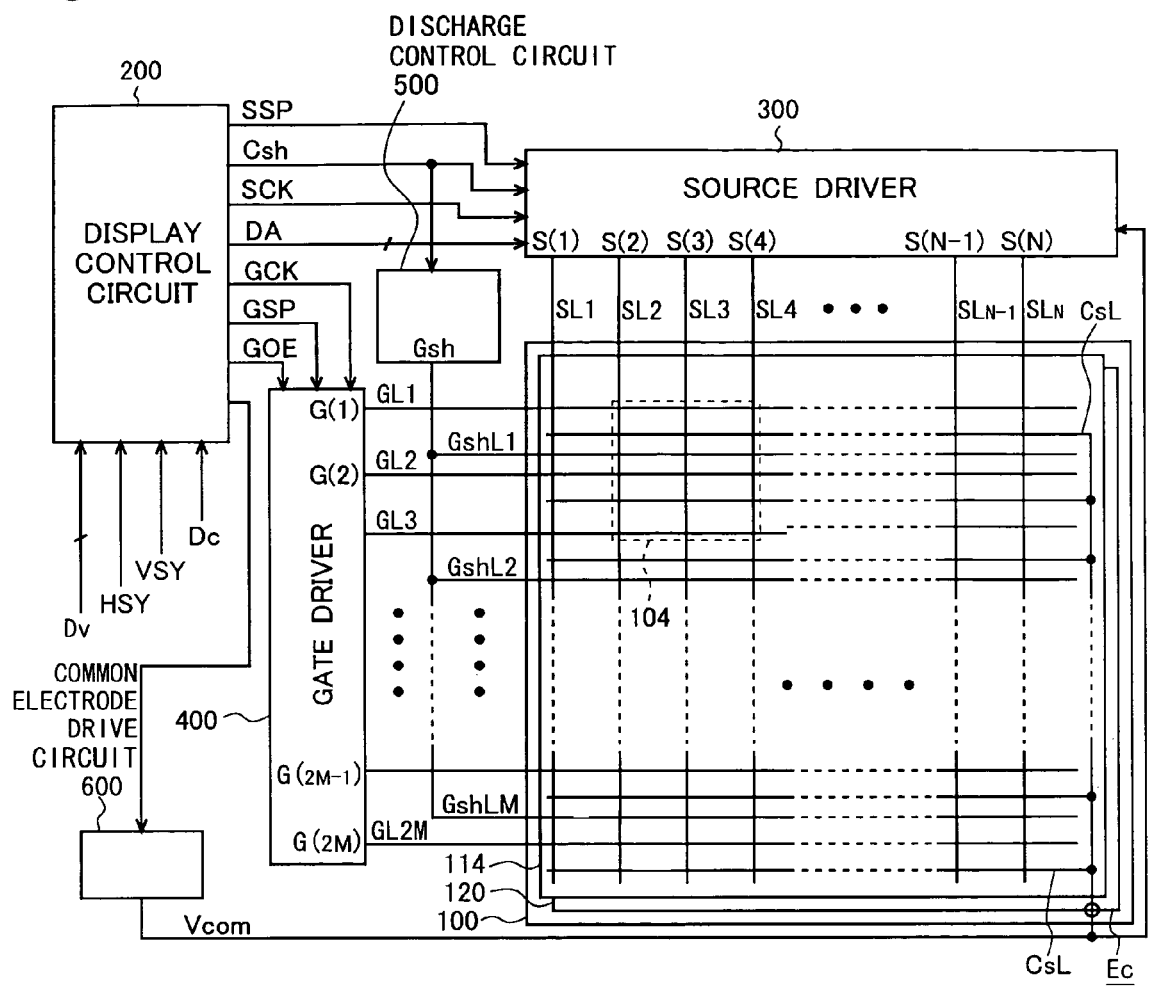
FIG. 23 is a block diagram showing a configuration of a liquid crystal display device according to a first variation of the first embodiment.
Figure 24:
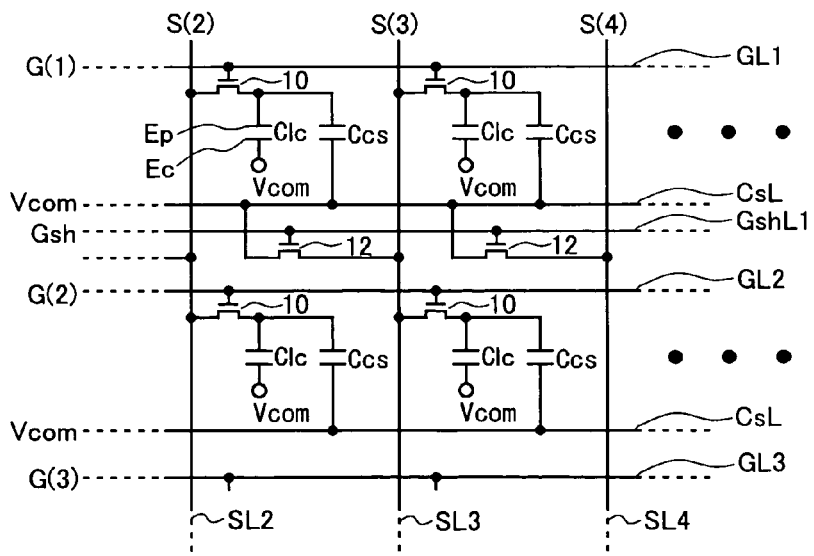
FIG. 24 is a circuit diagram showing an electrical configuration of an active matrix substrate in the first variation.

For example, instead of the configuration of the first embodiment shown in FIG. 8 and FIG. 9, the discharge control signal line may be disposed every other one of the gate lines GLj and the discharge TFT 12 may be disposed for each of the source lines SLi in numbers (M) equal to a half of the number of gate lines (2M) as shown in FIG. 23 and FIG. 24. Here, FIG. 24 is a circuit diagram showing an equivalent circuit of a part (corresponding to four pixels) 104 of the active matrix substrate 114 in the liquid crystal display device shown in FIG. 23.

Figure 25:
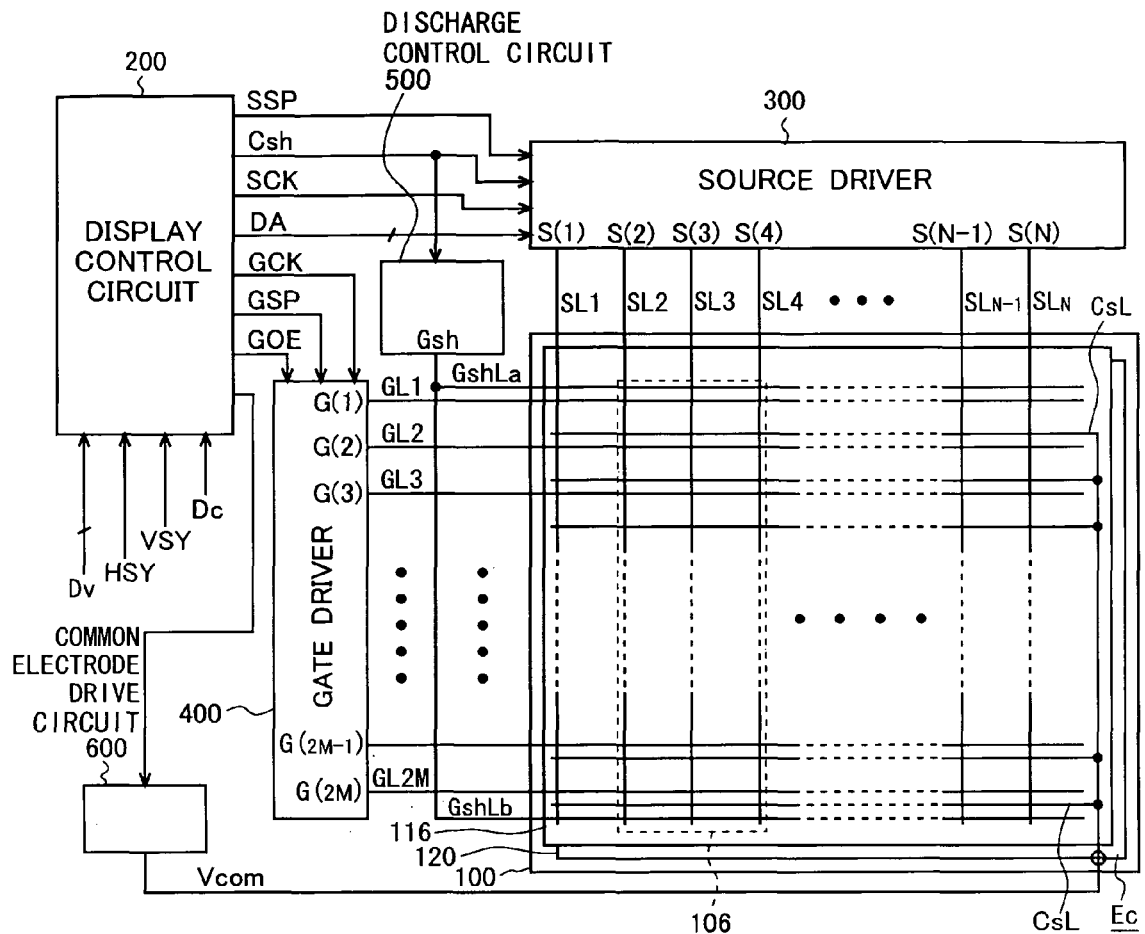
FIG. 25 is a block diagram showing a configuration of a liquid crystal display device according to a second variation of the first embodiment.
Figure 26:
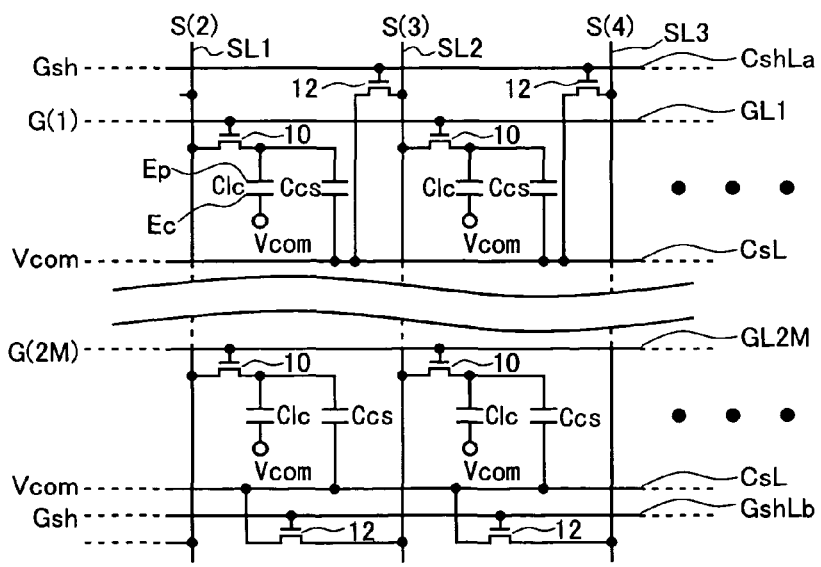
FIG. 26 is a circuit diagram showing an electrical configuration of an active matrix substrate in the second variation.

Further, in stead of the configuration of the first embodiment shown in FIG. 8 and FIG. 9, the discharge control signal lines GshLa and GshLb may be disposed only at the both ends of the source lines SL1 to SLN, respectively, and the discharge TFT 12 may be disposed one by one at one end and the other end of each of the source lines SLi, as shown in FIG. 25 and FIG. 26. Here, FIG. 26 is a circuit diagram showing an equivalent circuit of a part (corresponding to two pixel columns) 106 of the active matrix substrate 116 in the liquid crystal display device shown in FIG. 25.

Meanwhile, the number of discharge TFTs 12 necessary for causing the potential of each of the source lines to reach the value equal to the common potential Vcom within the discharge period Tsh depends on a wiring resistance and a wiring capacitance of the source line as well as an available length of the discharge period Tsh, which are determined by the screen size (corresponding to the size of the active matrix substrate), resolution and the like of the display device. Accordingly, in general, the number of the discharge TFTs 12 to be provided to each of the source lines SLi may be determined appropriately according to such screen size or resolution and the discharge TFTs 12 may be disposed in the determined numbers at an approximately equal interval in the direction in which the source line SLi extends. Then, the discharge control signal line may be disposed in numbers according to the number of TFTs 12 and these discharge control signal lines may be configured so as to turn on all the discharge TFTs 12 for the discharge period Tsh. According to such a configuration, it is possible to cause the accumulated charge of each of the source lines to be discharged uniformly over the entire active matrix substrate in a short time within the discharge period Tsh. Thereby, it is possible to cause the potential of each of the source lines to reach the value equal to the common potential Vcom uniformly over the entire active matrix substrate in a short time. As a result, it is possible to suppress the deterioration of display quality caused by the difference in the charged amount or the shortage of charging in the pixel capacitance even when a larger size or higher resolution is employed in the display device and the drive frequency thereof is increased.

Note that, while the dot inversion drive method is employed in the first and second embodiments, the present invention is not limited to this drive method and can be applied to a liquid crystal display device employing another drive method as far as it is configured such that the polarity of the data signal is inverted every predetermined number of horizontal periods. For example, for the active matrix type display device employing a drive method in which the polarity of the data signal is inverted every two horizontal periods with the polarities of all the data signals being the same as each other, that is, a two-line inversion method, it is possible to suppress the deterioration of display quality caused by the difference in the charged amount or the shortage of charging in the pixel capacitance by applying the present invention, while reducing power consumption by employing the common potential short-circuit method.

Further, in the above first to third embodiments, the common potential Vcom is applied to each of the source lines SL1 to SLN for the discharge period Tsh by the discharge TFTs 12 in the active matrix substrate 110 and the switch circuit in the output part 304 of the source driver, but this configuration may be replaced by a configuration in which a fixed potential equal to the DC level VSdc of the data signal S(i) (source center potential) is applied to each of the source lines SL1 to SLN for the discharge period Tsh. In this case, other than the common electrode drive circuit 600 as a potential supply part for applying the common potential Vcom to the common electrode Ec, a storage capacitance line drive circuit is provided as a potential supply part for applying the fixed potential equal to the DC level VSdc of the data signal S(i) to each of the storage capacitance lines CsL in the active matrix substrate 110 and the source driver 300. For a specific value of this fixed potential, a center value between the maximum value and the minimum value of the data signal S(i) may be used, for example. According to such a configuration, it is possible to make uniform the charge amount of the pixel capacitance Cp without depending on the polarity of the data signal to be applied to the pixel electrode.

Figure 27:
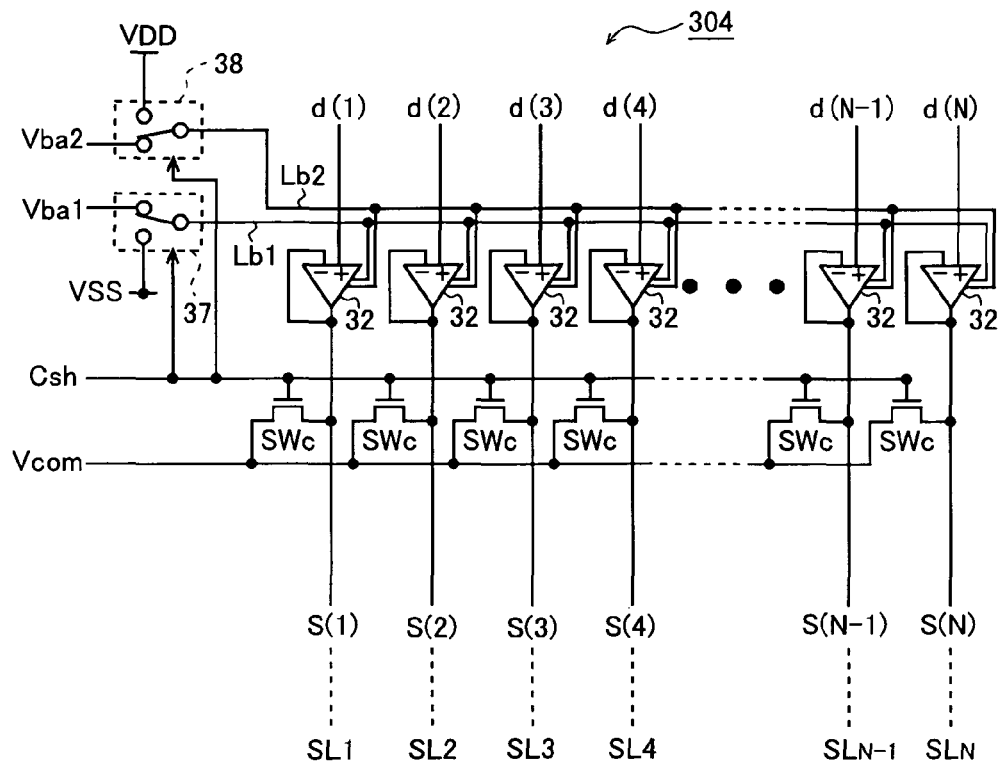
FIG. 27 is a circuit diagram showing a configuration for an output part of a source driver in a liquid crystal display device according to another variation of the first to third embodiments.

Further, in the first to third embodiments, the voltage follower is used as the output buffer 31 in the source driver 300 and a bias voltage is necessary for the operation of the voltage follower. However, the voltage follower as the output buffer 31 consumes power due to the internal current while the bias voltage is applied, even if the source line SLi is not driven. Accordingly, it is preferable to stop the application of the bias voltage to each of the output buffers 31 so as to prevent the internal current from flowing in the discharge period Tsh when the electrical connection between each of the buffers 31 and the source line SLi is cut off. FIG. 27 is a circuit diagram showing a configuration example of the output part 304 in the source driver for this purpose.

Figure 28:
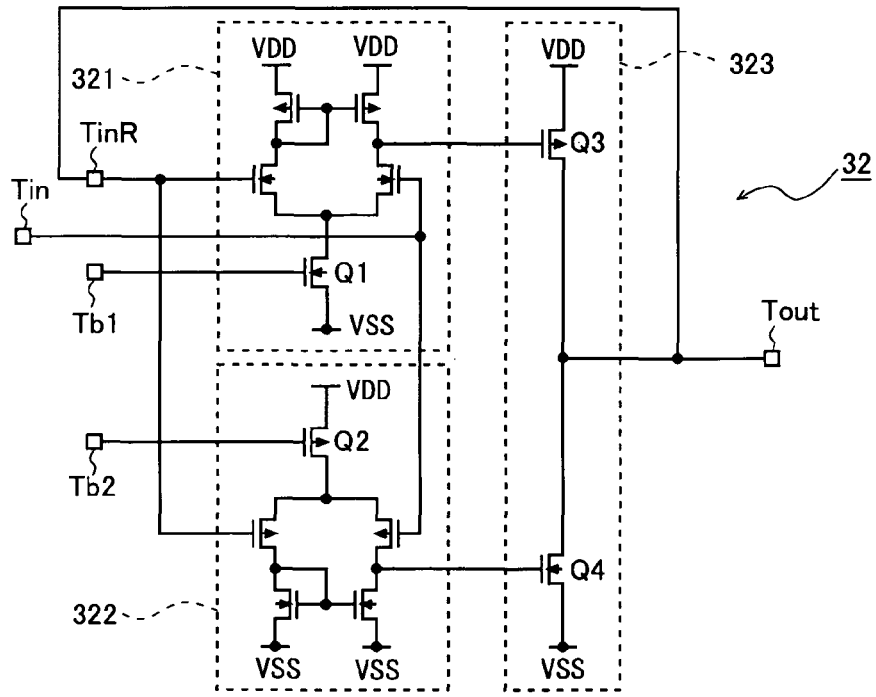
FIG. 28 is a circuit diagram showing an output buffer configuration of the output part of the source driver shown in FIG. 27.

FIG. 28 is a circuit diagram showing a configuration example of an output buffer 32 used in the configuration of FIG. 27. Note that the output buffer having the configuration of FIG. 28 can be used also in an output part having another configuration. As shown in FIG. 28, the output buffer 32 is configured with a first differential amplifier 321 having an N channel MOS transistor (hereinafter, abbreviated as "Nch transistor") Q1 to function as a constant current source, a second differential amplifier 322 having a P channel MOS transistor (hereinafter, abbreviated as "Pch transistor") Q2 to function as a constant current source, and a push-pull type output circuit 323 composed of a Pch transistor Q3 and an Nch transistor Q4, and the output buffer 32 has a non-inversion input terminal Tin, inversion input terminal TinR, output terminal Tout, a first bias terminal Tb1 connected to the gate terminal of the Nch transistor Q1, and a second bias terminal Tb2 connected to the gate terminal of the Pch transistor Q2. Further, the output terminal Tout is connected directly to the inversion input terminal TinR, and the output buffer 32 operates as a voltage follower when a predetermined first bias voltage Vba1 and a predetermined second bias voltage Vba2 are provided to the first bias terminal Tb1 and the second bias terminal Tb2, respectively. On the other hand, when the ground potential VSS is provided to the first bias terminal Tb1 and a power supply voltage VDD is provided to the second bias terminal Tb2, the Nch transistor Q1 and the Pch transistor Q2 become off-state, and the Pch transistor Q3 of the output circuit 323 is provided with a voltage approximately equal to the power supply voltage VDD and the Nch transistor Q4 is provided with a voltage approximately equal to the ground potential VSS. Thereby, the Pch transistor Q3 and the Nch transistor Q4 also become off-state in the output circuit 323. This means that the output buffer 32 goes into a halt state, and in this halt state, current does not flow within the output buffer 32 and the output thereof goes into a high impedance state.

In the configuration example of FIG. 27, differently from the above embodiments, the first MOS transistor SWa and the inverter 33 are removed and the output terminal Tout of each of the output buffers 32 is connected directly to the output terminal of the source driver 300. Meanwhile, this configuration is provided with first and second switches 37 and 38, a first bias line Lb1 for connecting the first bias terminal Tb1 in each of the output buffers 32 to the first switch 37, and a second bias line Lb2 for connecting the second bias terminal Tb2 in each of the output buffers 32 to the second switch 38. Note that the internal data signal d(i) is provided to the non-inversion input terminal Tin as an input terminal of each of the output buffers 32. The first switch 37 is a switch for switching a voltage to be provided to the first bias line Lb1 according to the discharge control signal Csh. The first switch 37 provides the first bias voltage Vba1 to the first bias line Lb1 when the discharge control signal Csh exhibits the L level, and provides the ground potential VSS to the first bias line Lb1 when the discharge control signal Csh exhibits the H level. The second switch 38 is a switch for switching a voltage to be provided to the second bias line Lb2 according to the discharge control signal Csh. The second switch 38 provides the second bias voltage Vba2 to the second bias line Lb2 when the discharge control signal Csh exhibits the L level, and provides the power supply voltage VDD to the second bias line Lb2 when the discharge control signal Csh exhibits, the H level. Thereby, each of the output buffers 32 operates as a voltage follower when the discharge control signal Csh exhibits the L level and goes into the halt state when the discharge control signal Csh exhibits the H level. In this manner, the first and the second switches 37 and 38 function as a halt control part for each of the output buffers 32. Other constituents of the output part in the source driver shown in FIG. 27 are the same as those of the output part 304 in the source driver shown in FIG. 16, and the same part is denoted by the same reference symbol and description thereof will be omitted. Note that a configuration for generating the first and the second bias voltage Vba1 and Vba2 is the same as that in conventional cases and description thereof will be omitted.

According to the above described, configuration, during the period except for the discharge period Tsh, the discharge control signal Csh exhibits the L level and each of the internal data signal d(i) is applied to the source line SLi (i=1 to N) as the data signal S(i) via the output buffer 32. On the other hand, during the discharge period Tsh, the discharge control signal Csh exhibit the H level and the output buffer 32 is in the halt state and the output thereof is in the high impedance state, and to each of the source lines SLi, the common potential Vcom is provided via the second MOS transistor SWc. In this manner, it is possible to reduce power consumption in the source driver 300 by halting each of the output buffers during the discharge period Tsh, while realizing the same function as that in the above embodiments.

Note that the configuration of the output buffer 32 is not limited to that of FIG. 28 and may be any configuration in which the internal current can be reduced or cut off to be halted by switching of the bias voltage. Further, in a configuration in which the output of the output buffer 32 does not have the high impedance state in the halt state, the first MOS transistor SWa may be inserted between each of the output buffers 32 and the output terminal of the source driver, as in the configuration shown in FIG. 16. Further, in the configuration shown in FIG. 27, the output terminals of the output buffers 32 may be connected with each other via the respective second MOS transistors SWc instead of providing the second MOS transistors SWc with the common potential Vcom. Furthermore, the second MOS transistors SWc may be removed.

5. Application to a Television Receiver

Figure 29:
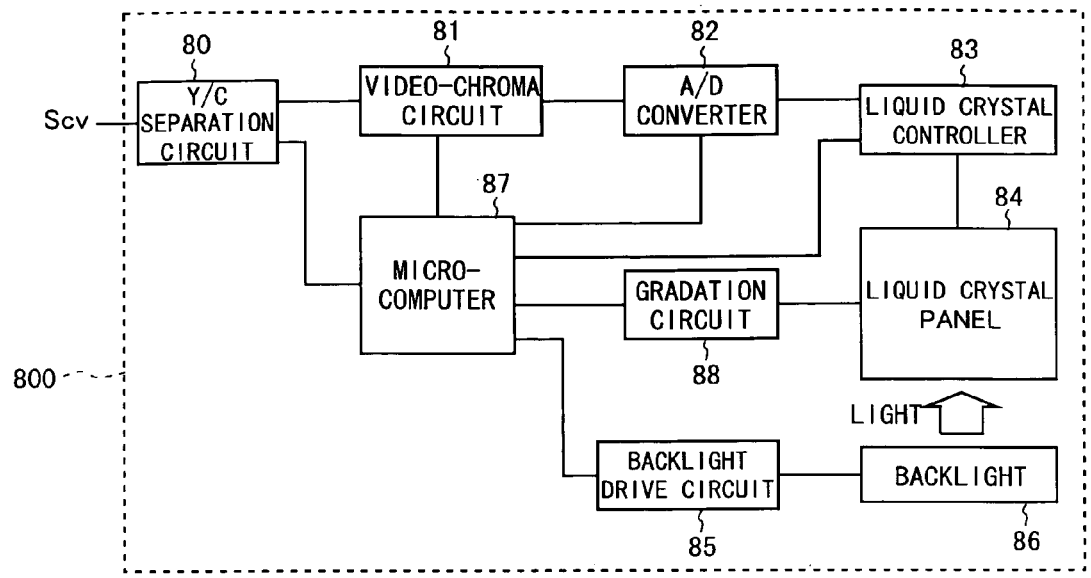
FIG. 29 is a block diagram showing a configuration example of a display device for a television receiver using the active matrix substrate according to the present invention.

Next, an example will be described for application of the active matrix substrate according to the present invention to a television receiver. FIG. 29 is a block diagram showing a configuration of a display device 800 for the television receiver. The display device 800 is provided with a Y/C separation circuit 80, a video-chroma circuit 81 an A/D converter 82, a liquid crystal controller 83, a liquid crystal panel 84, a backlight drive circuit 85, a backlight 86, a microcomputer 87, and a gradation circuit 88.

The liquid crystal panel 84 includes a display part using the active matrix substrate according to the present invention, and a source driver, a gate driver, and a discharge control circuit for driving the display part, and a specific configuration thereof may be any one described in each of the embodiments or each of the variations of the present invention (refer to FIGS. 8, 9, 15, 18, and 23 to 26).

In the display device 800 with the above configuration, first a composite color video signal Scv is inputted from outside into the Y/C separation circuit 80 as a television signal and separated there into a luminance signal and color signals. These luminance signal and color signals are converted into analog RGB signals corresponding to the light's three primary colors in the video-chroma circuit 81, and further these analog RGB signals are converted into digital RGB signals in the A/D converter 82. These digital RGB signals are inputted into the liquid crystal controller 83. Further, in the Y/C separation circuit 80, horizontal and vertical synchronization signals are extracted from the composite color video signal Scv inputted from outside and these synchronization signals are also inputted into the liquid crystal controller 83 via the microcomputer 87.

To the liquid crystal panel 84, the digital RGB signals are inputted from the liquid crystal controller 83 together with timing signals based on the above synchronization signals at a predetermined timing. Further, in the gradation circuit 88, gradation voltages of each of the three primary colors R, G, and B for color display are generated and the gradation voltages are supplied also to the liquid crystal panel 84. In the liquid crystal panel 84, drive signals (data signal, scanning signal, discharge control signal, etc.) are generated by an internal source driver, gate driver, etc. based on these RGB signals, timing signal and gradation voltage, and a color image is displayed on an internal display part (using the active matrix substrate) based on these drive signals. Note that, for displaying the image on the liquid crystal panel 84, it is necessary to illuminate the liquid crystal panel 84 with light from the back, and in the display device 800, the backlight 86 is driven by the backlight drive circuit 85 under the control of the microcomputer 87 and thereby illuminates the back surface of the liquid crystal panel 84 with light.

Control of the entire system including the above processing is performed by the microcomputer 87. Note that, for the video signal (composite color video signal) inputted from outside, not only a video signal from television broadcasting but also a video signal obtained by shooting with a camera, a video signal supplied via the internet line, or the like can be used, and image display of the various video signals is possible in the display device 800.

Figure 30:
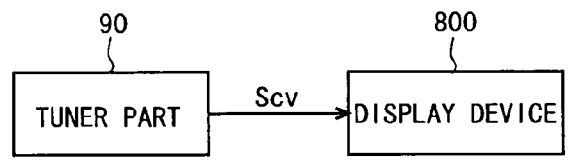
FIG. 30 is a block diagram showing an entire configuration, including a tuning part, of the television receiver using the active matrix substrate according to the present invention.

When an image of the television broadcasting is displayed on the display device 800 with the above configuration, a tuner part 90 is connected to the display device 800 as shown in FIG. 30. The tuner part 90 extracts a channel signal to be received from receiving waves (high frequency wave signal) received by an antenna (not shown in the drawing), converts the channel signal into an intermediate frequency signal, and takes out the composite color video signal Scv as a television signal by subjecting the intermediate frequency signal to detection. The composite color video signal Scv is inputted into the display device 800 as described above and an image according to the composite color video signal Scv is displayed on the display device 800.

Figure 31:
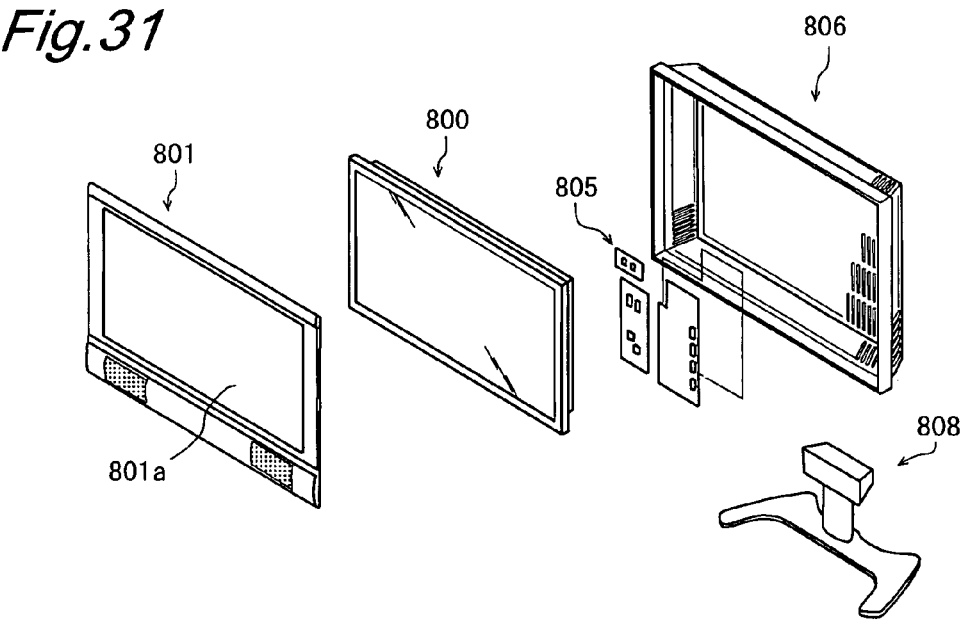
FIG. 31 is a perspective exploded view showing a mechanical configuration of the television receiver.
Figure 32:
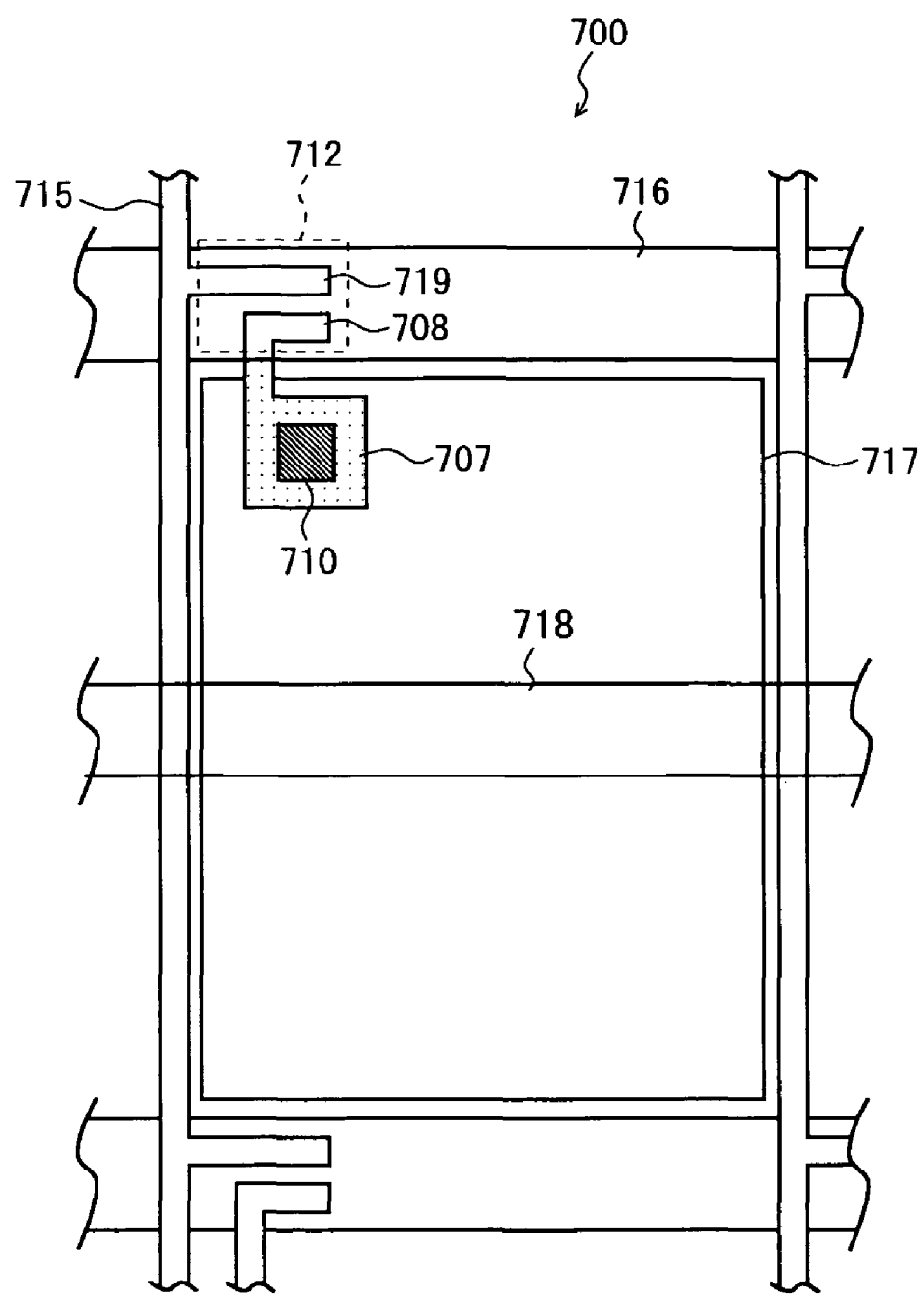
FIG. 32 is a partial plan view showing a pattern configuration of a conventional active matrix substrate.

FIG. 31 is a perspective exploded view showing an example of a mechanical configuration when the display device with the above configuration is applied to the television receiver. In the example shown in FIG. 31, the television receiver includes a first chassis 801 and a second chassis 806 in addition to the above display device 800 as constituents thereof, and is configured such that the first chassis 801 and the second chassis 806 sandwich the display device 800 so as to wrap the same. The first chassis 801 has an opening 801a formed for transmitting an image displayed on the display device 800. Further, the second chassis 806 is one to cover the back side of the display device 800 and provided with an operation circuit 805 for operating the display device 800 and also a supporting member 808 attached on the lower side.

In the television receiver as described above, a number of discharge TFTs 12 are provided for each of the source lines SLi on the active matrix substrate within the liquid crystal panel 84, and thereby it is possible to display a good image by suppressing the difference in the charged amount or the shortage of charging in the pixel capacitance even when a larger size or a higher resolution is employed in the display device and the drive frequency thereof is increased.

INDUSTRIAL APPLICABILITY

The present invention is applied to an active matrix substrate or a display device having the same, and particularly suitable for an active matrix type liquid crystal display device and an active matrix substrate used therefor.

The invention claimed is:

1. An active matrix substrate, comprising:
    a plurality of data signal lines;
    a plurality of scanning signal lines intersecting the plurality of data signal lines;
    a pixel switching element provided corresponding to each of intersections of the plurality of data signal lines and the plurality of scanning signal lines, the pixel switching element being turned on and off by the scanning signal line passing through the corresponding intersection;

a pixel electrode connected to the data signal line passing through the intersection corresponding to the pixel switching element via the pixel switching element;

a storage capacitance line disposed along each of the plurality of scanning signal lines so as to form a predetermined capacitance between itself and the pixel electrode;

discharge switching elements connected between each of the plurality of data signal lines and the storage capacitance line so as to cause a short-circuit in its on-state between each of the plurality of data signal lines and the storage capacitance line, predetermined number of two or more of the discharge switching elements being provided for each of the plurality of data signal lines in a direction in which the data signal line extends; and discharge control signal lines for turning on and off the discharge switching elements.

2. The active matrix substrate according to claim 1, wherein each of the plurality of data signal lines includes first and second signal lines electrically separated from each other, and predetermined number of two or more of the discharge switching elements are provided for each of the first and second signal lines in the direction in which the data signal line extends.

3. The active matrix substrate according to claim 1, wherein the discharge switching elements are disposed at a substantially equal interval in the direction in which the data signal line extends.

4. The active matrix substrate according to claim 1, wherein the discharge control signal lines include a plurality of control signal lines disposed along the plurality of scanning signal lines, respectively;

the discharge switching elements include a plurality of switching elements provided corresponding to the plurality of control signal lines for each of the plurality of data signal lines; and each of the plurality of switching elements is turned on and off by the corresponding control signal line.

5. The active matrix substrate according to claim 1, wherein the discharge switching elements include a group of switching elements disposed in a neighborhood of one end of the plurality of data signal lines and a group of switching elements disposed in a neighborhood of the other end of the plurality of data signal lines.

6. The active matrix substrate according to claim 1, wherein the storage capacitance line has an extended portion extended in a direction along the data signal line, and the discharge switching element is a thin film transistor having a drain electrode and a source electrode, the drain electrode being connected to the data signal line to be short-circuited to the storage capacitance line when the discharge switching element is in the on-state, and the source electrode being connected to the extended portion via a predetermined source extraction electrode.

7. The active matrix substrate according to claim 6, wherein the extended portion and the source extraction electrode constitute a structure disposed in a ring shape along an outer edge of the pixel electrode.

8. The active matrix substrate according to claim 6, wherein the extended portion and the source extraction electrode are connected with each other via a conductive electrode formed in a contact hole portion provided in a predetermined interlayer insulating film.

9. The active matrix substrate according to claim 8, wherein the conductive electrode is made of the same material as that of the pixel electrode.

10. The active matrix substrate according to claim 1, wherein the storage capacitance line comprises a ring shape portion including a portion extended along an outer edge of the pixel electrode in parallel to the data signal line and a portion extended along the outer edge of the pixel electrode in parallel to the scanning signal line.

11. The active matrix substrate according to claim 1, wherein the discharge switching element is disposed so as to overlap with an electrode pattern which forms the discharge control signal line.

12. The active matrix substrate according to claim 1, wherein:

the discharge switching element is a thin film transistor having first and second drain electrodes and a source electrode, the source electrode being connected to the storage capacitance line; and the first drain electrode being connected to one of the neighboring two data signal lines sandwiching the discharge switching element and the second drain electrode being connected to the other one of the two data signal lines.

13. The active matrix substrate according to claim 1, wherein the pixel electrode is disposed so as to overlap with the discharge control signal line.

14. A display device, comprising:

an active matrix substrate according to claim 1;

a scanning signal line drive circuit for generating a plurality of scanning signals for selectively driving the plurality of scanning signal lines and applying the plurality of scanning signals to the plurality of scanning signal lines, respectively;

a data signal line drive circuit for generating a plurality of data signals, which represent an image to be displayed, as voltage signals which invert polarities every predetermined number of horizontal periods and applying the plurality of data signals to the plurality of data signal lines, respectively;

a potential supply part for applying a predetermined potential to the storage capacitance line; and a discharge control circuit for generating a discharge control signal to be applied to the discharge control signal line so as to cause a short-circuit between each of the plurality of data signal lines and the storage capacitance line for a predetermined period of every one horizontal period.

15. The display device according to claim 14, wherein the data signal line drive circuit generates the plurality of data signals so as to invert the voltage polarities every predetermined number of two or more of horizontal periods.

16. The display device according to claim 14, wherein the data signal line drive circuit:

includes a switch circuit for cutting off the application of the plurality of data signals to the plurality of data signal lines and also short-circuiting the plurality of data signal lines with each other, for the predetermined period of every one horizontal period; and
generates the plurality of the data signals as voltage signals which invert polarities every predetermined number of data signal lines.

17. The display device according to claim 16, wherein the data signal line drive circuit applies the predetermined potential to the plurality of data signal lines when the plurality of data signal lines are short-circuited with each other by the switch circuit.

18. The display device according to claim 14, wherein the data signal line drive circuit includes a switch circuit for cutting off the application of the plurality of data signals to the plurality of data signal lines and also short-circuiting each of the plurality of data signal lines to the predetermined potential, for the predetermined period of every one horizontal period.

19. The display device according to claim 14, further comprising
a common electrode disposed so as to face each of the pixel electrodes in the active matrix substrate, wherein
the potential supply part applies a predetermined common potential to the common electrode and applies the common potential to the storage capacitance line as the predetermined potential.

20. The display device according to claim 14, wherein the potential supply part applies a potential corresponding to a center value between a maximum value and a minimum value of the data signal to the storage capacitance line as the predetermined potential.

21. The display device according to claim 14, wherein the predetermined potential is a potential corresponding to a black display, and
the scanning signal line drive circuit selectively drives the plurality of scanning signal lines such that each of the plurality of scanning signal lines is in a selected state for an effective scanning period other than the predetermined period at least once in each frame period and the scanning signal line, which was in the selected state for the effective scanning period, is in the selected state for the predetermined period, at least once after a predetermined pixel value holding time has elapsed from a time when the selected state changed to an unselected state and before the scanning signal line is in the selected state for the effective scanning period in the next frame period.

22. The display device according to claim 21, wherein the scanning signal line drive circuit causes the scanning signal line, which was in the selected state for the effective scanning period, to be in the selected state for the predetermined period a plurality of times after the pixel value holding time has elapsed from the time when the selected state changed to the unselected state and before the scanning signal line is in the selected state for the effective scanning period in the next frame period.

23. The display device according to claim 22, wherein a period during which each of the plurality of scanning signal lines is in the selected state for the effective scanning period does not overlap with a period during which any of the plurality of scanning signal lines is in the selected state for the predetermined period.

24. The display device according to claim 14, wherein the data signal line drive circuit includes:
a plurality of buffers for outputting the plurality of data signals to be applied to the plurality of data signal line's, respectively; and
a halt control part for halting the plurality of buffers for the predetermined period.

25. A television receiver comprising a display device according to claim 14.

26. A drive method of an active matrix substrate including: a plurality of data signal lines; a plurality of scanning signal lines intersecting the plurality of the data signal lines; a pixel switching element provided corresponding to each of intersections of the plurality of data signal lines and the plurality of scanning signal lines, the pixel switching element being turned on and off by the scanning signal line passing through the corresponding intersection; a pixel electrode connected to the data signal line passing through the intersection corresponding to the pixel switching element via the pixel switching element; and a storage capacitance line disposed along each of the plurality of scanning signal lines so as to form a predetermined capacitance between itself and pixel electrode, the drive method of the active matrix substrate comprising:
a scanning signal line drive step of generating a plurality of scanning signals for selectively driving the plurality of scanning signal lines and applying the plurality of scanning signals to the plurality of scanning signal lines, respectively;
a data signal line drive step of generating a plurality of data signals, which represent an image to be displayed, as voltage signals which invert polarities every predetermined number of horizontal periods and applying the plurality of data signals to the plurality of data signal lines, respectively;
a potential supply step of applying a predetermined potential to the storage capacitance line; and
a discharge step of short-circuiting each of the plurality of data signal lines to the storage capacitance line every one horizontal period, wherein the active matrix substrate further includes:
discharge switching elements connected to each of the plurality of data signal lines and the storage capacitance line so as to short-circuit each of the plurality of data signal lines to the storage capacitance line when the discharge switching elements are in its on-state, predetermined number of two or more of the discharge switching elements being provided for each of the plurality of data signal lines in a direction in which the data signal line extends; and
discharge control signal lines for turning on and off the discharge switching elements, and wherein
in the discharge step, each of the plurality of data signal lines is short-circuited to the storage capacitance line by a signal provided to the discharge control signal line for turning on the discharge switching element for a predetermined period of every one horizontal period.

* * * * *